US012411676B1

(12) United States Patent
Lanner et al.

(10) Patent No.: US 12,411,676 B1
(45) Date of Patent: Sep. 9, 2025

(54) RESOURCE AWARE PATCHING SERVICE

(71) Applicant: Amazon Technologies, Inc., Seattle, WA (US)

(72) Inventors: Mats Erik Lanner, Seattle, WA (US); Alan Hadley Goodman, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/666,371

(22) Filed: Feb. 7, 2022

Related U.S. Application Data

(63) Continuation of application No. 15/190,108, filed on Jun. 22, 2016, now Pat. No. 11,243,755.

(51) Int. Cl.
G06F 9/44 (2018.01)
G06F 8/65 (2018.01)

(52) U.S. Cl.
CPC ...................................... *G06F 8/65* (2013.01)

(58) Field of Classification Search
None
See application file for complete search history.

(56) References Cited

U.S. PATENT DOCUMENTS

| 6,438,749 | B1 * | 8/2002 | Chamberlain | G06F 11/1433 |
| | | | | 714/E11.135 |
| 7,748,000 | B2 | 6/2010 | Genty et al. | |
| 8,261,353 | B2 * | 9/2012 | Hirsave | G06F 21/577 |
| | | | | 717/172 |
| 9,009,694 | B2 * | 4/2015 | DiRico | G06F 8/65 |
| | | | | 717/169 |
| 9,442,715 | B2 * | 9/2016 | Zhang | H04L 67/10 |
| 9,582,373 | B2 | 2/2017 | Zellermayer et al. | |
| 2003/0218628 | A1 * | 11/2003 | Deshpande | G06F 8/65 |
| | | | | 715/738 |
| 2006/0048134 | A1 | 3/2006 | Napier et al. | |
| 2006/0075401 | A1 * | 4/2006 | Smegner | G06F 8/65 |
| | | | | 717/174 |
| 2006/0080656 | A1 * | 4/2006 | Cain | G06F 8/65 |
| | | | | 434/118 |
| 2007/0033445 | A1 | 2/2007 | Hirsave et al. | |
| 2007/0113225 | A1 * | 5/2007 | Felts | G06F 8/65 |
| | | | | 717/172 |

(Continued)

OTHER PUBLICATIONS

Anonymous, "Products page for Docker Engine," retrieved from https://www.docker.com/products/container-runtime/ on Jul. 28, 2022, 5 pages.

(Continued)

*Primary Examiner* — Bradley A Teets
*Assistant Examiner* — Lanny N Ung
(74) *Attorney, Agent, or Firm* — Davis Wright Tremaine LLP

(57) ABSTRACT

A patching service provides customers with a mechanism to automate patching of customer operated computing resources. A set of patch actions may be specified for various computing resource. A patch workflow may be used to deploy patches to the computing resource. The patch workflows may be generated based at least in part on attributes of the computing resources and the set of patch actions. The patch workflows may be stored and used to deploy patches to the customer operated computing resources.

22 Claims, 13 Drawing Sheets

(56) References Cited

U.S. PATENT DOCUMENTS

| | | | |
|---|---|---|---|
| 2007/0244999 A1* | 10/2007 | Hamanaka | H04L 67/34 709/220 |
| 2008/0313626 A1 | 12/2008 | Kodaka et al. | |
| 2009/0013321 A1* | 1/2009 | Mattiocco | G06F 9/455 718/1 |
| 2010/0162226 A1* | 6/2010 | Borissov | G06F 8/65 717/173 |
| 2011/0258621 A1 | 10/2011 | Kern | |
| 2011/0276695 A1* | 11/2011 | Maldaner | H04L 41/00 709/226 |
| 2012/0072571 A1* | 3/2012 | Orzell | G06F 11/008 718/1 |
| 2012/0089972 A1 | 4/2012 | Scheidel et al. | |
| 2012/0174086 A1* | 7/2012 | Raju | G06F 8/65 717/168 |
| 2013/0031158 A1 | 1/2013 | Salsburg | |
| 2013/0047147 A1* | 2/2013 | McNeill | G06F 9/45533 717/173 |
| 2013/0263104 A1 | 10/2013 | Baset et al. | |
| 2014/0376362 A1 | 12/2014 | Selvaraj et al. | |
| 2015/0033287 A1 | 1/2015 | Oliphant et al. | |
| 2016/0103673 A1* | 4/2016 | Curran | G06F 8/658 717/168 |
| 2016/0266892 A1* | 9/2016 | Sn | G06F 3/0619 |
| 2017/0039046 A1* | 2/2017 | Henke | G06Q 10/0631 |
| 2017/0364345 A1* | 12/2017 | Fontoura | G06F 9/5072 |
| 2018/0136960 A1* | 5/2018 | Zhang | G06F 8/65 |

OTHER PUBLICATIONS

Microsoft, "WSUS Overview," Overview of the WSUS Process, 2017, retrieved on Jun. 14, 2017, from https://technet.microsoft.com/en-us/library/cc539281.aspx, 1 page.

White et al., "Microsoft Windows Server Update Services (WSUS) Review." 2004, 14 pages.

4 Wikipedia, "JSON," Retreived from https://en.wikipedia.org/wiki/JSON on Jul. 28, 2022, 11 Pages.

* cited by examiner

RESOURCE AWARE PATCHING SERVICE

CROSS REFERENCE TO RELATED APPLICATIONS

This application is a continuation of U.S. patent application Ser. No. 15/190,108, filed Jun. 22, 2016, entitled "RESOURCE AWARE PATCHING SERVICE," the disclosure of which is herein incorporated by reference in its entirety. This application also incorporates by reference for all purposes the full disclosure of co-pending U.S. patent application Ser. No. 15/190,115, filed Jun. 22, 2016, "PATCH BASELINE FOR RESOURCE AWARE WORKFLOWS," now abandoned.

BACKGROUND

The use of hosted computing service and storage has proliferated in recent years. The resources for network computing and storage are often provided by computing resource providers who leverage large-scale networks of computers, servers, and storage drives to enable clients, including content providers, customers, and the like, to host and execute a variety of applications and web services. The usage of network computing resources allows content providers and customers, among others, to efficiently and adaptively satisfy their computing needs. However, with the growing use of virtual resources, customers are encountering situations in which managing the virtual resources may be difficult to accomplish, such as applying software update or patches to the virtual computing resources. In many cases, customers transmit requests to create instances such as, for example, virtual machine instances to execute on hardware devices. These instances can be automatically scaled or workloads may be balanced between instances, enabling the service provider to accommodate customer needs during the situations requiring additional computing capacity. However, the variety of different architectures, the number of computing resources, and types of computing resources a customer may operate creates difficulty in managing these computing resources.

In addition, patching software executed by the computing resources described above may be a time-consuming, tedious, and repetitive process. For many customers, updating software is a manual process, requiring on-going coordination between administrators and managers to ensure the right patches are deployed, in a controlled manner, while limiting the impact to customer applications. For the customer, automating this process is difficult, requiring a large time investment, deep technical skills, and the knowledge of existing patching solutions. Many customers are not able to meet these requirements or the cost to do so is prohibitive to many customers.

BRIEF DESCRIPTION OF THE DRAWINGS

Various techniques will be described with reference to the drawings, in which.

DETAILED DESCRIPTION

Figure 1:
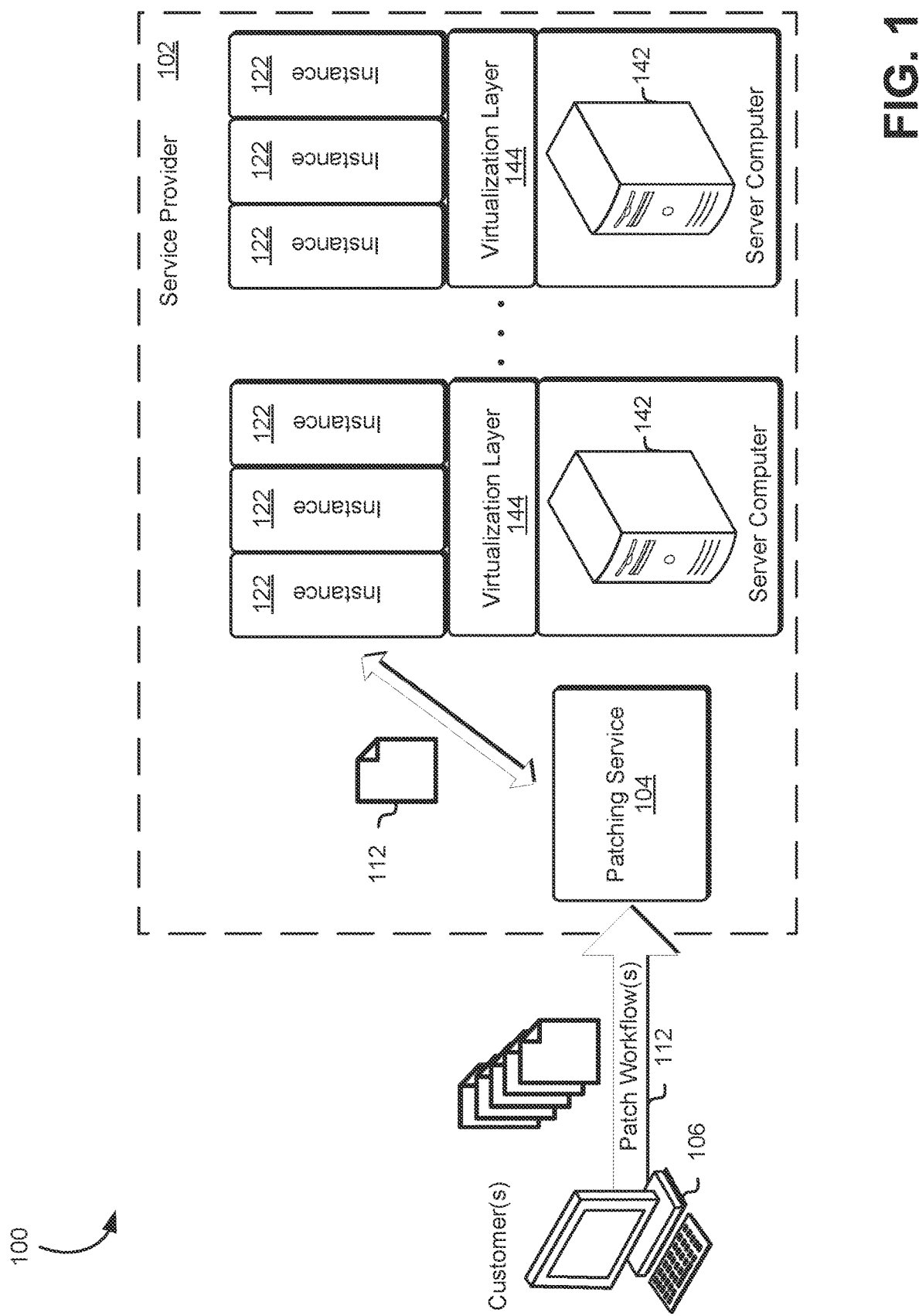
FIG. 1 illustrates an environment in which a patching service may automate certain aspects of software patching computing resources on behalf of a customer in accordance with an embodiment.

In various examples described below, a computing resource service provider provides customers with access to various computing resources to execute and/or operate various applications on behalf of the customer. For example, customers may be provided with access to a virtual computer system service; the virtual computer system service may provide customers with access to on-demand computing resources such as virtual machines instances or similar host computer systems. These instances or host computer systems operated by the customer may occasionally require updates or patches to applications and other executable code executed by the instances or host computer systems. For example, the customer may operate a virtual machine instance executing a particular version of an operating system or other operating system, the developers of the operating system may release patches or other software updates that the customer may choose to apply or otherwise install on the customer's virtual machine instance. These patches and other software updates may include critical updates, security updates, bug fixes, improved or additional functionality, or other modifications or additions to existing applications.

A patching service provided by the computing resource service provider automates patching (e.g., software patching or updating) of computing resources on behalf of the customers of the computing resource service provider. The customer may, using a management console or other user interface described in greater detail below, to generate patch orchestrations, execute patching workflows, create maintenance windows, patch baselines, or otherwise specify and/or modify the behavior of the patching service. A patch orchestration service may enable the customer to create, delete, modify, execute, terminate, or otherwise control automation of patching the customer's computing resource. An orchestration may control the executions of patch workflows, enable customers to define a set of computing resources to execute the patch workflows, define a velocity for executing the patch workflows, define parameters for the patch work flows, and define logging for the execution of the patch workflows and other mechanisms for controlling the execution of the patch workflow. A patch workflow may include a linear sequence of actions created from the set of pre-patch actions, patch actions, and post-patch actions specified by the customer for execution when the patch workflow is created.

In addition, the patch workflow may include specific operation(s) based at least in part on a type or attribute of the computing resource that is a target of the patch workflow. For example, if the target of a particular patch orchestration includes a set of virtual machine instances that are members of an auto-scaling group and a second set of virtual machine instances that are behind a load balancer, the patching service may generate a specific patch workflow for the virtual machine instances that are members of the auto-scaling group and the virtual machine instances that are behind the load balancer. The specific operations of each patch workflow are described in greater detail below. The customer may also create maintenance windows which allow the customer to specify a time period for the execution of the patch workflows on particular targets. In yet other embodiments, the type or attribute(s) of the computing resource that is a target of the patch workflow may not indicate specific operation(s) to include in the patch workflow and the patch workflow may execute without modification.

The customer may also define a patch baseline, the patch baseline may enable the patching service or component thereof, such as the patch orchestration service, to define a set of rule indicating which patches should be deployed as part of a particular patch workflow. The patch baseline may also include a set of rules indicating how scans for new patches and computing resources to be patched should be executed. In addition, the patch baselines may allow the customer to define approval rules by application (e.g., an operating system, web application, word processing application, or other applications), category (e.g., critical update, security update, or other update), severity, or other logical groupings of rules. The rules may also specify a duration of time or other interval from when a patch was released before the patch may be approved without customer intervention. For example, a rule may specify that a critical patch must have been released at least 7 days before it is approved. The patch baseline may also allow the customer to define a set of approved patched and block patches. For example, the customer may define a whitelist and a blacklist; every patch included in the whitelist may be executed on a set of targets defined in a patch orchestration using a patch workflow during a defined maintenance window regardless of other rules defined in the patch baseline. Alternatively, any patch included in the blacklist may not be applied to the customer's computing resources despite the other rules of the patch baseline.

In the preceding and following description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 shows an illustrative example of an environment 100 in which customers may define patch workflows 112 for use by a patching service 104 to modify executable code of an instance 122 in accordance with an embodiment. A computing resource service provider 102 may provide computing resources to customers 106. The customers 106 may utilize physical hosts, described in greater detail below, operated by the computing resource service provider 102 to perform a variety of functions. For example, the customers 106 may operate a website or log server using the computing resources of the computing resource service provider 102. Furthermore, the computing resource service provider 102 may provide additional service to the customer 106. For example, the computing resource service provider 102 may provide the customer 106 with access to an auto-scaling service, load-balancing service, database service, on-demand storage service, or other service. In turn, these services may provide the customer with access to various different types of computing resources or may modify and/or extend the operations of other computing resources.

In some embodiments, the customers 106 may include organizations that operate computing resources which may be accessible to other customers of the computing resource service provider or other entities in general. For example, the customer may operate a website that is accessible to users over a network, such as the Internet. The term "organization," unless otherwise clear from context, is intended to be read in the broad sense to imply a set of principals organized in some manner. The customers 106 may use computing resources of the computing resource service provider 102 to operate a load balancer and auto-scaling group configured to distribute requests to computing resources, such as instances 122, of the customer 106.

For example, auto-scaling groups, described in greater detail below, may comprise a set of instances 122 operated by the customer 106. The auto-scaling group may be configured to add or remove instances 122 and other computing resources to/from the auto-scaling group based at least in part on a setting provided by the customers 106 and/or computing resource service provider 102. A specific patch workflow 112 may be created so that the patching service 104 may appropriately patch or otherwise modify the executable code of the instances 122 of the auto-scaling group. For example, the patch workflow 112 may indicate whether to add additional computing resources to the auto-scaling group when an instance 122 is being patched or otherwise modified as a result of an operation of the patch workflow 112. The patching service 104 may determine operations of the patch workflow 112 required to modify the executable code of the computing resource based at least in part on attributes of the computing resource.

For example, the patching service 104 may determine particular operations required to patch the computing resource if the computing resources are associated with a load balancer or if the computing resources are operating a database on behalf of the customer. The particular operations may include, for example, moving a computing resource from behind a load balancer, adding a computing resource to an auto-scaling group, generating a snapshot of a computing resource, or any other operations required to complete the patch work flow 112 successfully and/or defined by the customer 106. The customer 106 may define a single patch workflow 112 for all computing resources operated by the customer 106 or some portion of the computing resources operated by the customer 106 (e.g., grouping the customer's computing resources into sets of targets). The patching service 104 may then generate a variety of different patch workflows 112 based at least in part on the attributes of the computing resources indicated by the customer 106. The process for grouping targets (e.g., computing resources to be patched or otherwise updated) and generating patch workflows 112 for various computing resources is described in greater detail below. Furthermore, the patching service 104 may generate one or more patch workflows 112 for all or a portion of the instances 122 associated with the customer 106.

As illustrated in FIG. 1, the computing resources of the customers 106 may include and/or be implemented by physical hosts operated by the computing resource service provider 102. However, in various embodiments, the computing resources utilized by the customers 106 include computing resources of the customer or other entities in accordance with the present disclosure. For example, the customer may operate a load balancer using computing resources of the computing resource servicer provider 102 to direct traffic to one or more servers operated by the customers 106. The load balancer may be a computer system or virtual computer system configured to distribute requests to one or more instances 122, supported by the physical hosts, in order to optimize resource utilization and/or avoid overloading a particular computer instance. For example, the load balancer may include physical hardware connected to a server rack or otherwise included in a data center. In another example, the load balancer may include one or more instances 122 supported by a particular physical host operated by the computing resource service provider 102 as described in greater detail below. The patching service 104 may perform particular operations when executing a particular patching workflow on an instance associated with a load balancer. For example, the particular patching workflow may de-register the instance 122 being patched so that the load balancer does not distribute traffic to the instance 122 while the patching service 104 is executing the patch workflow 112 on the instance 122.

The customer 106 may interact with the computing resource service provider 102 and other service provided by the computing resource service provider 102, such as the patching service 104, via appropriately configured and authenticated application program interface (API) calls to provision, operate, and manage instances 122 instantiated on server computers 142 and operated by the computing resource service provider 102. The customer 106 may be provided a user interface, such as a management console described in greater detail below, to create, manage, and operate patch orchestrations, patch workflows, patch baselines, maintenance windows, and other components of the patching service 104. The management console may be exposed to the customers as a webpage; by interacting with the webpage (e.g., through a browser application), the customer may cause API calls to be generated. The generated API calls may cause the computing resource service provider 102 or component thereof such as the patching service 104 to perform various operations indicated by the customer.

As illustrated in FIG. 1, the server computer 142 may be any device or equipment configured to execute instructions for performing data computation, manipulation, or storage tasks, such as a computer or a server. A server computer 142 may be equipped with any needed processing capability including one or more processors, such as a central processing unit (CPU), a graphics processing unit (GPU), or a digital signal processor (DSP), memory, including static and dynamic memory, and buses and input and output ports that are compliant with any handshaking, communications, or data transfer protocol. The physical hardware of the server computer 142 may also include storage devices, such as storage disks and tapes, networking equipment, and the like.

A virtualization layer 144 may include a bare metal hypervisor or a hosted hypervisor. The virtualization layer 144 executing on the server computer 142 enables the physical hardware to be used to provide computational resources upon which one or more instances 122 may operate. For example, the virtualization layer may enable an instance 122 to access physical hardware on the server computer 142 through virtual device drivers on the instance 122. The virtualization layer 144 may include a hypervisor or virtualization software and/or hardware. The virtualization layer 144 may also include an instance of an operating system dedicated to administering the instances 122 running on the server computer 142. Each virtualization layer 144 may include its own networking software stack responsible for communication with other virtualization layers 144 and, at least in some embodiments, may also be responsible for implementing network connectivity between the instances 122 running on the server computer 142 and other instances 122 running on other server computers 142.

Furthermore, the server computer 142 may host multiple virtualization layers 144 of the same or different types on the same server computer 142. The virtualization layer 144 may be any device, software, or firmware used for providing a virtual computing platform for the instances 122. The virtual computing platform may include various virtual computer components, such as one or more virtual CPUs, virtual memory, and the like. The instances 122 may be provided to the customers 106 of the computing resource service provider 102 and the customers 106 may run an operating system or an application on the instances 120 as described above. Further, the computing resource service provider 102 may use one or more of its own instances 122 for executing its applications including services as described herein. At least a portion of the instances 122 may execute kernel-level components for one or more other instances 122. For example, a particular computer instance may execute a parent partition configured to manage one or more child partitions executed by other instances 122 where the particular computer instance and the other computer instances are supported by the same virtualization layer 144. All of the instances 122 described herein may be patched or otherwise have executable code modified by the patching service 104 based at least in part on one or more patch workflows 112.

Commands and other information may be included in an API call from the patching service 104 or to the virtualization layer 144. As described above, the parameters for the patch workflows 112 may be provided to the patching service 104 via an API call. In addition, the patching service 104 may communicate with the virtualization layer 144 and/or other services of the computing resource service provider 102 via API calls. For example, the patching service 104 may transmit an API call to an auto-scaling service to remove an instance 122 from an auto-scaling group. As a result, the auto-scaling service may transmit an API call to a virtualization layer 144 supporting the instance 122 to fulfil the API call transmitted by the patching service 104. Alternatively, the patching service 104 may transmit API calls directly to the computing resources to complete operations of the patch workflow 112.

As described in greater detail below, the patch workflow 112 may include a variety of different actions, the action may be executed by the target instance 122 (e.g., the instance 122 that is the target of the patch or modification of executable code) or by another computing resource such as a container instance. The target instance 122 may execute the action using a run command or similar command provided to the target instance. Example actions and/or commands that may be performed by the instances 122 include reboot operations, test operations, requests for information from the target instance, execution and/or installation of a particular patch file, or other operations that may be executed by the instances 122 to patch an application or other executable code. The run commands may be used to directly cause the execution of an application or other executable code by the instances 122. The run commands may be provided to the instances 122 through a virtualization layer, agent executed by the instances 122, or any other mechanism for transmitting a command to the instances 122. For example, the run commands may be executed through a terminal of an operating system executed by the instance 122.

Execution of operations included in the patch workflow 112 by a container instance are described in greater detail below in connection with FIG. 7 and include a variety of operations that may require and/or involve a computing resource outside of the instances 122 such as creating a snapshot or other serialization of the instances 122 to be persisted by a storage device. Other actions may include any action associating or disassociating the instances 122 or various other types of computing resources with one or more other computing resources. For example, the process and/or operations of associating and disassociating computing resources may include adding and removing an instance from an auto-scaling group, adding and removing and instance from a load balancer, connecting and disconnecting computing resources from one another, or any other operations that add or remove an association between computing resources.

Figure 2:
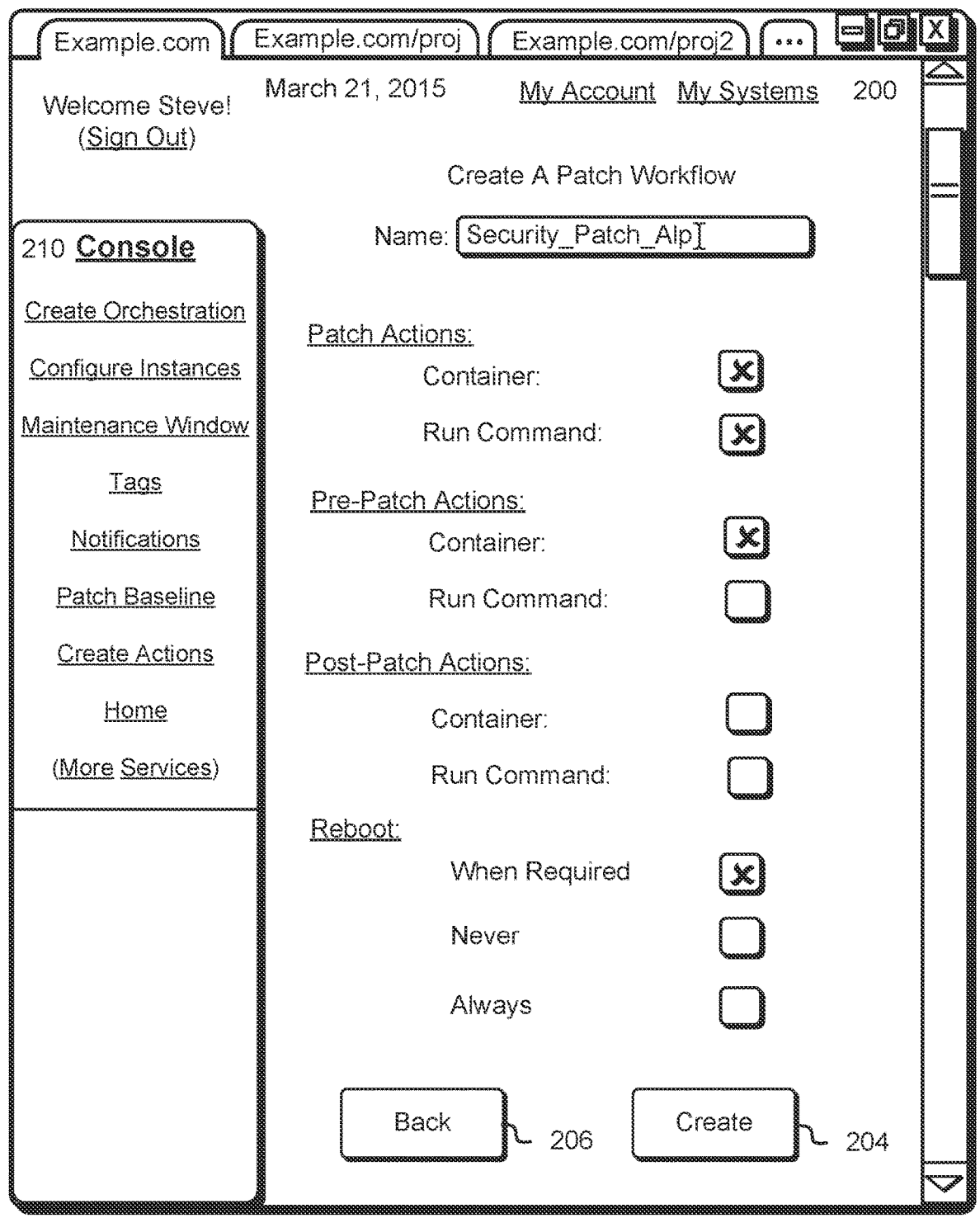
FIG. 2 illustrates a management console exposed as a webpage enabling customers to create a patch workflow used to automate certain aspects of software patching computing resources in accordance with at least one embodiment.

FIG. 2 shows a webpage 200 which may be displayed by an application executed by a computing system enabling a user to interact with a patching service operated by the computing resource service provider. As illustrated in FIG. 2, the webpage 200 includes various graphical user interface elements that enable users to provide information suitable for creating a patch workflow by the patching service of the computing resource service provider through a management console of which the webpage 200 is a part. In various embodiments, the user interacts with the patching service by issuing commands through the management console. The webpage 200 may be displayed by various applications, such as a mobile application or web browser. In this example, the webpage 200 includes various navigational features. For instance, on the left-hand side of the webpage 200, various links 210 may link to one or more other webpages that contain additional content corresponding to a variety of different actions the user may cause to be performed.

The management console pages may correspond to operations that may be taken to create, modify, delete, manage, or otherwise control operation of the patching service before, during, and after patching instances of various types managed by an instance service or other computing services of the computing resource service provider. In this example, the links appear as textual words which enable the links to be selected using an appropriate input device such as a keyboard, mouse, touchscreen or other input device. Selection of one of the links 210 may cause an application displaying the webpage 200 to submit, pursuant to a URL associated with the selected link by the programming of the webpage 200, a request, such as an HTTP request, for the content associated with the link to a server that provided the webpage 200 or another server.

In this example, the webpage 200 also includes a graphical user element configured as a "create" button 204. The create button 204 may be a graphical user interface element of the webpage 200 where the underlying code of the webpage 200 is configured such that selection by an input device of the create button 204 causes information corresponding to the selection of a particular parameters and/or requirements of a patch workflow selected on the webpage 200 to be transmitted to the patching service. Furthermore, through the management console, the user may be guided through the process of selecting various parameters, constraints, and/or requirements associated with creating a patch workflow for instances of one or more different instance categories or attributes. The process may be divided into steps and the user may be prompted to provide information at each step. For example, a customer, through the management console, may be presented with a list of instances associated with the customer. The customer may then select a set of instances to generate a patch workflow, the management console may then display potential parameters, constraints, and/or requirements based at least in part on the set of instances selected. For example, if an instance of the set of instances is associated with a load balancer, the management console may display parameters, constraints, and/or requirements for generating a patch workflow for instances associated with a load balancer. In another example, the customer may, through the management console, provide a default or single set of parameters, constraints, and/or requirements for generating patch workflows.

The user, using an input device, may select a set of parameters, constraints, and/or requirements used by the patching service to generate one or more patching workflows. For example, the customer may indicate a preference for rebooting instances after patch installation. In another example, as described in greater detail below, the customer may select pre-patch actions, post-patch actions, and/or patch action to be performed either by a run command or a container instance. Once the user has made a selection of pre-patch actions, post-patch actions, and/or patch action (including whether such actions would be executed by a run command or container instance), the user may then be guided through the process of defining and/or creating such actions. For example, the customer may be presented with a set of options to choose from various components that may be combined into rules or may be presented with a set of complete rules from which to select. The user selection may be stored until the entire process is completed or the user selection may be transmitted to the instance service upon selection of a graphical user interface element. In some embodiments, the customer may provide all or a portion of a patch workflow directly to patching service.

As illustrated in FIG. 2, the webpage 200 may contain a graphical user interface element configured as a check box or radio button configured to enable the user to select various options displayed by the webpage 200. Selection of the check box or radio button may cause the underlying code of the webpage 200 to causes information corresponding to the selection of the check box or radio button to be transmitted to the patching service. The webpage 200 may contain a graphical user interface element configured as an input box. The input box may enable the user, through an input device such as a keyboard or virtual keyboard, to provide information, such as a customer assigned named for the patch workflow as illustrated in FIG. 2. The management console of which webpage 200 is a part may also be configured such that the management console is connected to or responsible for orchestration and execution of the patch workflows as described above in connection with FIG. 1. For example, the management console may provide an interface for managing the execution of various patch workflows on sets of instances and determining which patch workflows to execute for different sets of instances.

The webpage 200 may also include a graphical user element configured as a "back" button 206. The back button 206 may be a graphical user interface element of the webpage 300 where the underlying code of the webpage 200 causes the application displaying the webpage 200 to transmit a command to the computing systems to return to a previously navigated webpage of the management console. In this example, the webpage 200 contains a prompt asking the user to provide information which may be utilized by the patching service to generate one or more patch workflows. The selection of patch workflow information provided to the customer using the webpage 200 may be included in the webpage 200 based at least in part on user preference, popularity among users, features of the instances, features of the instances selected by the customer, capacity/load requirements selected by the user, an administrator associated with the customer, or other information suitable for providing requirements associated with a patch workflow.

Once the customer has made a selection using the webpage 200 and selected the create button 204, the application displaying the webpage 200 may submit a request, such as an HTTP request, to the patching service to generate one or more patching workflows based at least in part on the information provided in the webpage 200. The request may be transmitted to one or more server computers of the patching service operated by the computing resource service provider. Furthermore, the patching service may obtain additional information from one or more other services in order to complete the request from the user. For example, the patching service may obtain capacity information from a data storage service, instances information from an instance service, auto-scaling information from an auto-scaling service, load balancing information from a load-balancing service, database information from a database service, or other information from various services of the computing resource service provider as described herein.

The patching service may then process that information obtained from the webpage 200 and generate a patch workflow that defines the pre-patch, post-patch, patch actions, and a reboot policy based at least in part on the information obtained from the webpage 200. Alternatively, the patch workflow may simply include a patch action (e.g., actions and/or operations required to install a patch or update a particular instance). By specifying a run command task, the customer may specify actions and/or operations to be performed by the instance. For example, a run command may include the execution of a script by the instance. While specifying contained instances the customer may cause actions and/or operations to be performed outside the instance enabling access to additional computing resources, API call, and network operations. An example of an action and/or operations that is performed using a container instance includes removing an instance from behind a load balancer (e.g., the instances is a member of a set of instances that receive traffic from the load balancer) prior to executing patch operations on the instance and then returning the instance behind the load balancer after patching of the instance is completed.

In addition, the customer may specify parameters for execution of both the run commands and container instances. For example, a parameter to the container instance may include an instance ID so that the container instance may identify and detect the particular instance being patched. In various embodiments, the container instances may be used to execute pre-patch and post-patch action but a run command is required to execute the patch (e.g., modify the executable code of the instance) on the instance. Returning to FIG. 2, once a customer has specified that a particular action is to be performed by a container instance, the customer may be prompted to provide additional parameters for execution of the container instance such as an instance ID, priority, customer ID, maintenance window information, orchestration information, or any other information which may be used to execute an action of a patch workflow. In various embodiments, the patching service or other service of the computing resource service provider returns, in response to the request, such as an HTTP request, from the customer, identification information configured to identify the patch workflow generated by the patching service based at least in part on the information provided by the customer through the webpage 200. As discussed herein, in other examples, the patching service may transparently implement the patching workflows without alerting the customer.

Figure 3:
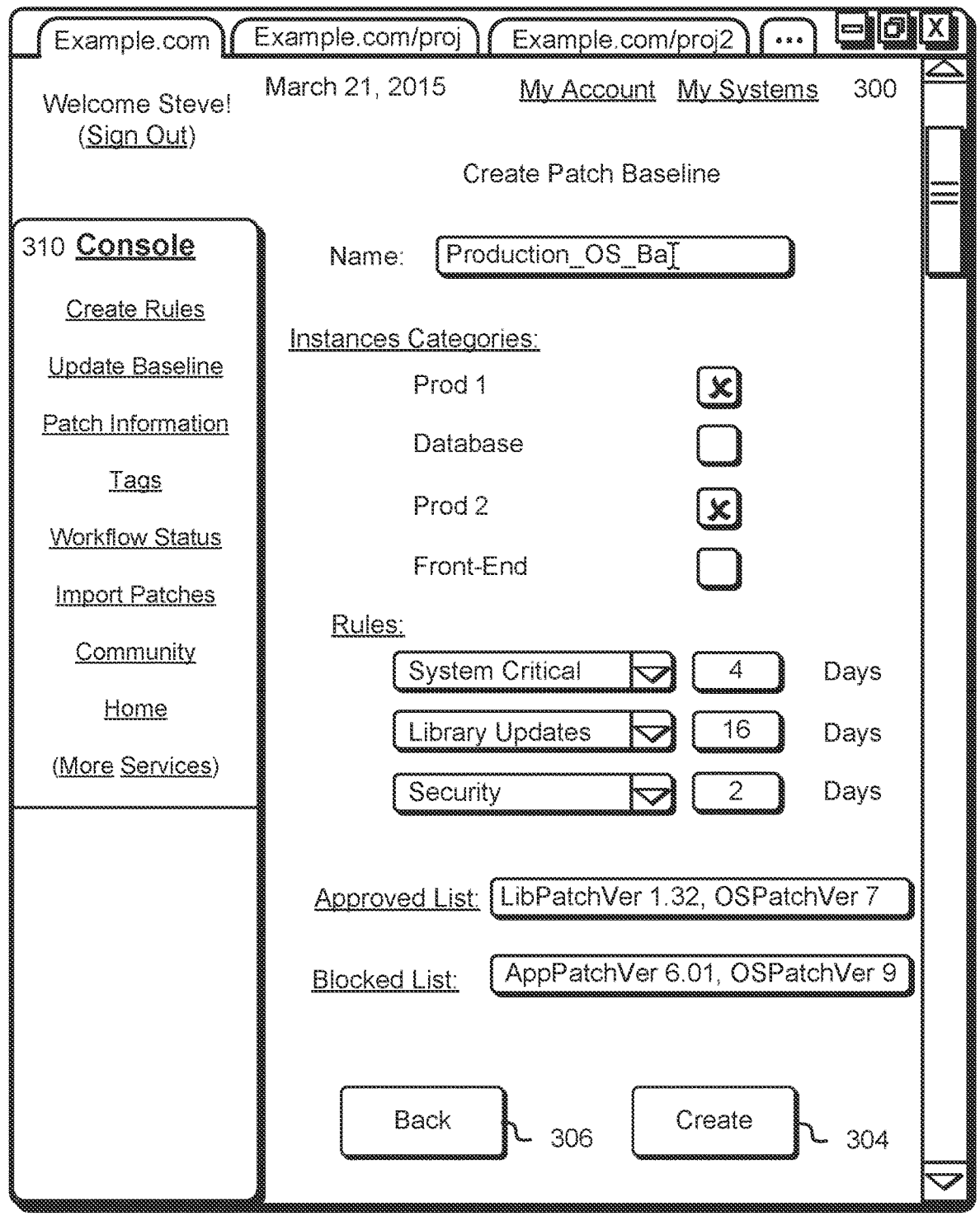
FIG. 3 illustrates a management console exposed as a webpage enabling customers to create a patch baseline used to automate certain aspects of software patching computing resources in accordance with at least one embodiment.

FIG. 3 shows a webpage 300 which may be displayed by an application executed by a computing system enabling a user to interact with a patching service or component thereof such as a patch baseline service operated by the computing resource service provider. As illustrated in FIG. 3, the webpage 300 includes various graphical user interface elements that enable users to provide patch baseline requirements for patching customer computing resources provided by the computing resource service provider through a management console of which the webpage 300 is a part. In various embodiments, the user interacts with the patching service by issuing commands through the management console. The webpage 300 may be displayed by various applications, such as a mobile application or web browser. In this example, the webpage 300 includes various navigational features. For instance, on the left-hand side of the webpage 300, various links 310 may link to one or more other webpages that contain additional content corresponding to a variety of different actions the user may cause to be performed.

The console pages may correspond to operations that may be taken to manage or otherwise control a patch baseline for various instance types or other computing resources managed by services of the computing resource service provider. In this example, the links appear as textual words which enable the links to be selected using an appropriate input device such as a keyboard, mouse, touchscreen or other input device. Selection of one of the links 310 may cause an application displaying the webpage 300 to submit, pursuant to a URL associated with the selected link by the programming of the webpage 300, a request, such as an HTTP request, for the content associated with the link to a server that provided the webpage 300 or another server.

In this example, the webpage 300 also includes a graphical user element configured as a "create" button 304. The create button 304 may be a graphical user interface element of the webpage 300 where the underlying code of the webpage 300 is configured such that selection by an input device of the create button 304 causes information corresponding to the selection of a particular patch baseline requirement and/or settings selected on the webpage 300 to be transmitted to the patching service or component thereof such as the patch baseline service described in greater detail below. Furthermore, through the management console, the user may be guided through the process of selecting various constraints, settings, and/or requirements associated with a patch baseline. The process may be divided into steps and the user may be prompted to provide information at each step. For example, the webpage 300 displays to the user a list of instances to apply the patch baseline to, rules for applying patches, a whitelist, and a blacklist for establishing a patch baseline.

The user, using an input device, may select a set of instances to apply a particular patch baseline. Additionally, the customer may indicate rules or preferences for when to apply patches. For example, as illustrated by FIG. 3, the customer may select from a drop down menu various patch types such as system critical, library updates, security, or any other category or type of patch or software update. In various embodiments, a patch or software update may belong to more than one category, for example, system critical and security. The drop down menu may be prepopulated of the customer may categories various patches. The category of the patches may be determined based at least in part on metadata associated with the patches. In addition, the customer may specify a number of days or time interval at the end of which patches of the particular category indicated in the drop down menu may be applied. The delay or time period may enable the customer or other individuals or organizations to test the patches. The user selection may be stored until the entire process is completed or the user selection may be transmitted to the instance service upon selection of a graphical user interface element.

As illustrated in FIG. 3, the webpage 300 may contain a graphical user interface element configured as an input box configured to enable the user to enter a desired value for a name of the patch baseline as well as the approved list and the blocked list. The name of the patch baseline may be used by the customer to identify the particular patch baseline. The approved list (e.g., whitelist) may include a list of patches that the customer provides, the patches in the list may be installed regardless of the rules defined in the patch baseline. For example, a library updated patch in the approved list may be installed during a maintenance window regardless of whether the 16 day time interval set by the customer's rule for library updates has expired. Similarly, patches listed in the blocked list (e.g., black list) may never be installed regardless of the rules included in the patch baseline. For example, a system critical update in the black list may not be installed in a maintenance window regardless of the 4 day time interval indicated in the rule expiring. The management console of which webpage 300 is a part of may also be configured such that the management console is connected to the patching service as described above in connection with FIG. 1. For example, the management console may provide an interface for managing the customer patch baseline and automated patching of the customer computing resources.

The webpage 300 may also include a graphical user element configured as a "back" button 306. The back button 306 may be a graphical user interface element of the webpage 300 where the underlying code of the webpage 300 causes the application displaying the webpage 300 to transmit a command to the computing system to return to a previously navigated webpage of the management console. In this example, the webpage 300 contains a prompt asking the customer to provide information which may be used by the patch baseline service to create a patch baseline. The patch baselines may be used by the patch workflows, described above, to define which patches to deploy, as a result, by generating multiple sets of rules along with a corresponding approval schedule allows the customer to control the rate of patch approval and allows different sets of patches to be deployed based at least in part on the multiple set of rules and associated interval of time. For example, a patch baseline includes a first set of rules that causes all critical security patches to be approved on Tuesdays following release, a second set of rules that causes all important patches to be approved two weeks after release, and a third set of rules approving all other patches a week after approving all important patches.

Once the user has made a selection using the webpage 300 and selected the create button 304, the application displaying the webpage 300 may submit a request, such as an HTTP request, to the patch baseline service to generate a patch baseline based at least in part on the information provided in the webpage 300. The request may be transmitted to one or more servers of the patch baseline service operated by the computing resource service provider. Furthermore, the patch baseline service may obtain additional information from one or more other services in order to complete the request from the user. For example, the patch baseline service may obtain patch data (e.g., a set of patches and associated metadata) from a patch database described in greater detail below.

Figure 4:
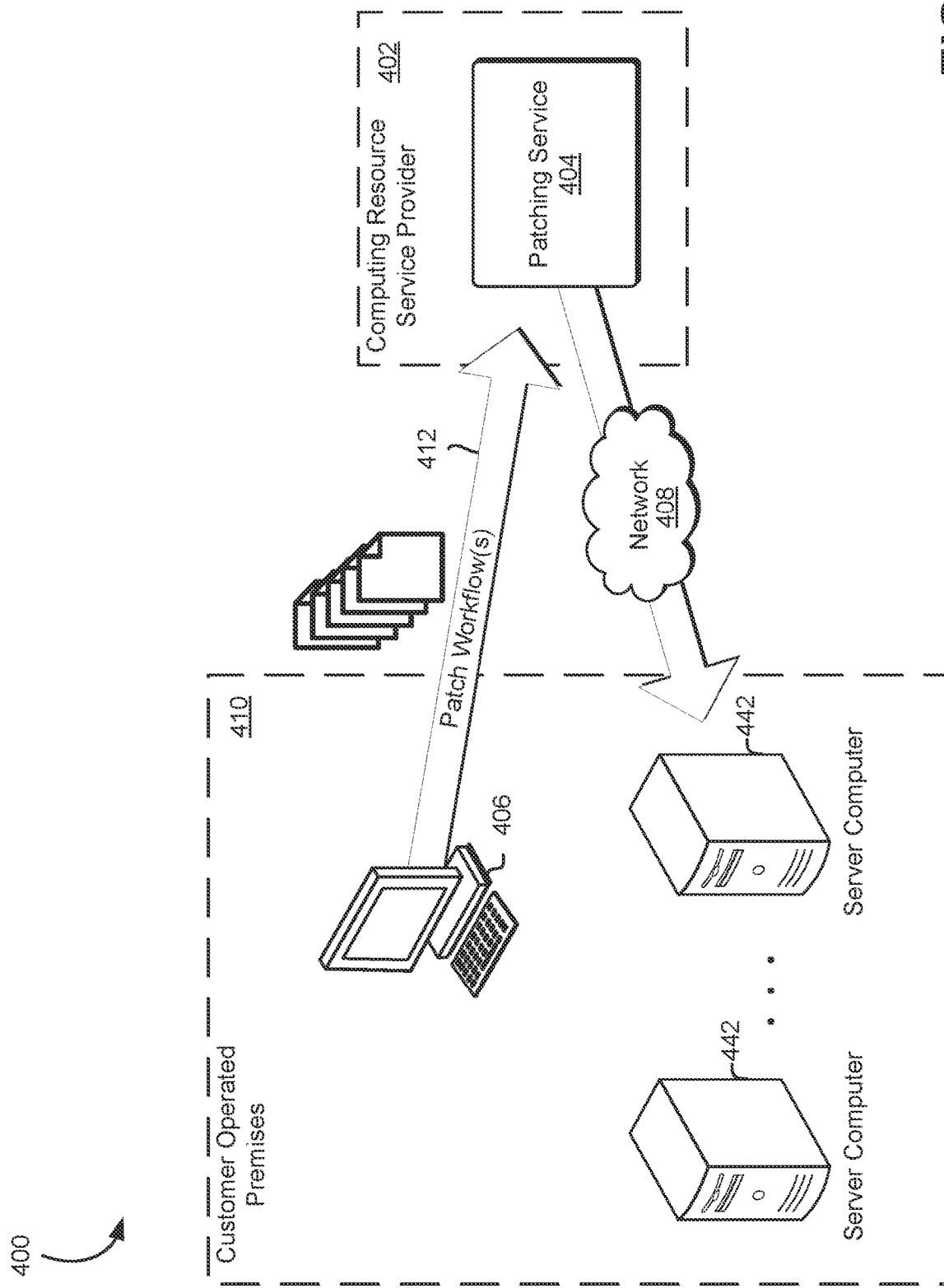
FIG. 4 illustrates an environment in which a patching service may automate certain aspects of software patching computing resources of a customer operated premises in accordance with an embodiment.

FIG. 4 shows an illustrative example of an environment 400 in which a patching service may be used by a customer 406 to automate the process of patching or otherwise modifying the executable code or one or more server computers 442 operated by the customer 406. A computing resource service provider 402 may provide the patching service 404 as a service to one or more customers. In addition, the computing resource service provider 402 may provide additional services to customers as described herein. The computing resource service provider 402 may provide the services, such as the patching service, using one or more server computers distributed over various networks and geographic locations. The computing resources service provider 402 and services of the computing resources service provider 402 may connect to the one or more server computers operated by the customer over a network 408. The network 408 may be a communication network, such as the Internet, an intranet, an internet service provider (ISP) network and/or some other such network as described below.

The sever computers 442 may be located within a customer operated premises 410, such as a data center, office, facility, or other location from which the customer may operate. The customer 406 may provide patch workflows 412 to the patching service as described above. In addition, the customer may provide the patching service 404 with a patch baseline, maintenance, window, and/or patch orchestration information as described herein. The patching service 404 may utilize computing resources of the computing resource service provider 402 to automate patching activities on behalf of the customer 406. The customer 406 may also provide the patching service 404 and/or computing resource service provider 402 with access to the server computers 442 operated by the customer 406. For example, the server computers may be protected by various security features such as a firewall or private intranet. The customer 406 may provide authentication information, login information, virtual private network (VPN) information, credential information, policy information, role information, or other information to enable the patching service 404 to access the server computer 442.

The server computers 442 may include any virtual or physical computing resources that may be operated by the customer 406 such as servers, desktop computers, laptop, virtual computer instances, or other computing resources. As described in greater detail below, during a maintenance window the patching service 404 may, using a patch baseline, determine a set of patches to apply to the server computers 442. The patching service 404 may then connect remotely to the server computers 442 to be patched and transmit commands to be executed by the server computers 442 to complete one or more patch workflows 412. The patch workflows 412 executed by the server computers 442 may include any of the pre-patch actions, post-patch actions, patch actions, or reboot policies described herein.

The environment such as that illustrated in FIG. 1 may be useful for a provider such as a computing resource provider, wherein the computing resource system responds to requests from customers to automate at least a portion of the process required to patch computing resources. As discussed above, the computing resource service provider provides a mechanism to allow customers to generate maintenance windows, patch orchestrations, patch workflows, and patch baselines. The environment in such a case may include additional components and/or other arrangements, such as those illustrated in the networked environment 500 of FIG. 5. In this example, the networked environment 500 includes a computing resource service provider in data communication with a client device 506 and server computers 542 over a network 508. In one embodiment, the server computers 542 may be one or more computer hardware devices that are used to implement instances 522. For example, the server computers 542 may include hardware for implementing types of computing resources, such as storage devices, virtualized storage devices, networking devices, and the like as described herein. Additionally, the implemented computing resources may be programmatically and remotely managed by a customer of the computing resource service provider.

The server computers 542 include a plurality of computer system devices that are each capable of executing one or more instances 522 created by the computing resource service provider. In one embodiment, each of the server computers 542 includes a data store, an input/output bus, and/or any other component known in the art for executing instances 522. Additionally, the instances 522 may be virtual machine instances. As known in the art, a virtual machine instance is an instance of a software implementation on a machine (i.e., a computer) that executes programs like a physical machine. For example, each of the server computers 542 may be configured to execute an instance manager 518 capable of implementing the instances 522. For example, the instance manager 518 may be a hypervisor, virtualization layer, or any other type of program configured to enable the execution of multiple instances 522 on a single server computer 542. As discussed above, each of the instances 522 may be configured to execute all or a portion of an application. Additionally, the network 508 may be similar to the network as described above. The networked environment 500 may span one or more data centers, where each data center may be geographically distinct from each other. Additionally, the networked environment 500 shown in FIG. 5 may be one of several embodiments employed by the computing resource service provider.

In one embodiment, the computing resource service provider includes a patching service 504 which in turn includes various services and/or micro-services such as a patch data store 510, a patch orchestration service 512, a patch baseline service 526, an automation service 534, a maintenance window service 532, a patch workflow service 536, a notification service 530, and/or other components. The other components may include other services of the computing resource service provider which the patching service 504 has access to, such as load balancer service, metrics service, auto-scaling service, instance service, or other services. The patch data store 510 may include one or more patches 546. For example, as described above, the patch data store 510 includes one or more records of patches 546 which may be applied to instances 522, the records may include metadata associated with the patches 546 such as a category associated with the patches 546.

Unless otherwise stated or clear from context, the term "service" or "micro-service" may be understood to be a computer system program, process, client, server, service, application, module, operating system entity, controlling domain, communication node or collection of these and/or other such computer system entities. A "service" may be a client and/or a server and in some embodiments may be configured to send and/or receive communications, data, requests, and/or other such requests from other services within the computer system.

The patch orchestration service 512 provides a mechanism for customers to provide information to automate patching operations on computing resources operated by the customer. In addition, the patch orchestration service 512 may provide default patch workflows that the customer may use for various applications. For example, the patch orchestration service 512 may provide a default patch workflows to automate patching operations for instances executing a particular operating system using an operating system update agent (included in the operating system) which may be used for most common patching scenarios. Furthermore, the patch orchestration service 512 may scan computing resources for missing patches 546, obtain patches 546, and store patches 546 in the patch data store 510. In various embodiments, the patch orchestration service 512 provides public APIs or other mechanisms to receive requests 538 from the client device 506 to perform various functions of the patching service 504.

The patch baseline service 526 enable customers to set a patch baseline which may include a set of rules for automatically approving or denying patches or similar modification to executable code. In one embodiment, the patch baseline service 526 receives, from the customer on the client device 506, a request 538 to create one or more patch baselines. The customer may provide a schedule for approving particular patches or types of patches. For example, the customer may specify that all security patches are approved two days after release. As described above, metadata associated with the patches may be used to determine a type or category of the patch. Examples of this information (e.g., type information) in the metadata include classification information (e.g., critical, security, update, etc.), product information, severity (e.g., important, moderate, etc.), identification number, knowledge base article numbers, release date, language, name, description, Uniform Resource Identifier (URL), information indicating whether a particular patch has been superseded, and whether a replacement patch is available for a particular patch that has been superseded. As described in greater detail below, the patching service 504 or component thereof such as the patch orchestration service, may determine one or more patches to deploy based at least in part on the customer's patch baselines.

The customer may also submit a request 538 for information associated with the patch baseline. For example, the customer can query the patch baseline service 526 for information associated with a set of currently effective patches. In addition, the patch baseline service 526 may provide the customer with information indicating what patches will be deployed during a particular maintenance window. The patch baseline service 526 may also obtain patch information periodically or aperiodically and apply rules contained in the one or more patch baselines to determine a set of patches 546 to be deployed. In some embodiments, the patch baseline may target an instance 522 category or type. For example, the customer may assign tags to the instances 522, such as production, database, web-server, or any other term which may have meaning to the customer. The customer may then define a patch baseline for a particular type (e.g., a patch baseline for production instances). The customer may also edit, delete, check the status of, or otherwise modify one or more patch baselines maintained by the patch baselining service 526. As described above, the customer may submit a request 538, such as an API call or other command to perform such operations. In some embodiments, the patch baseline service 526 provides versioning for the edit or modification of patch baselines. The patch baseline service 526 may also provide rule validation for the patch baselines.

The patch workflow service 536 enables the customer to create particular patch workflows for various instances 522. The customer may customize patch deployment for one or more instances 522 processed by creating a patch workflow, for example, by using a management console as described above or submitting requests 538 such as an API call directly to the patch workflow service 536. The patch workflow may define the pre-patch actions, post-patch actions, and patch actions during patch deployment. All or a portion of these actions may be specified by the customer or provided by the patch workflow service 536 by default. As described above, the actions may include a run command or a call to a container instance. Run command tasks may be executed by the instances 522. Action executed by the container instances may access computing resources and data outside of the instances 522. For example, a particular action executed by a container instance may modify the operation of a load balancer 540 and/or an auto-scale group 520 described in greater detail below.

Furthermore, the customer may provide parameters for execution of the actions. For example, the customer may assign a role for a particular run command action. The role may include an administrator role that provides the run command with the appropriate rights to execute an operation (e.g., deploy a patch) on the instance 522. Similarly, container instances may be provided with parameters to be used during execution such as identification information for the instances 522, load balancers 540, auto-scale group 520, or other parameters required for execution of the particular action. For example, a pre-patch action executed by a container instance may include persisting a snapshot of the instances 522, this requires the customer to provide parameters for the instance ID and storage location for the snapshot.

Pre-patch actions may occur prior to deployment of the patch 546 and post-patch actions may occur after deployment of the patch. For example, the customer may want to ensure that a particular application executed by the instance 522 is terminated prior to deployment of a patch 546. The customer may also specify a reboot policy as described above. For actions in the patch workflow that have failed, the patching service 504 may ignore the error and continue or stop the particular patch workflow. Error handling may be defined for each action, may be defined globally for all patch workflows, or a combination. In addition, error handling may be specified by the customer or the patching service 504. If a particular action is configured to ignore errors, the patch workflow may simply continue with the next action in the patch workflow and may log the failure appropriately. However, if the particular action is configured to stop the patch workflow on errors, no more actions may be performed and an overall failure for the workflow will be reported.

In addition, a number of individual retry attempts may be specified for each action in the patch workflow. The patching service 504 may retry failed patch workflows until the number of retry attempts is reached or exceeded. Furthermore, if the particular action is configured to ignore failures, no retries may be performed. A timeout interval for an action in the patch workflows may also be provided. This may cause actions to fail if the timeout interval is exceeded. In some embodiments, the actions of the patch workflow are modified in an attempt to mitigate the failure. The customer can request from the maintenance window service 532 retrieval of patch workflow execution history and obtain detailed logs to identify the issue and/or failures. Created patch workflows may be modified and a new version of the patch workflow may be created. The new version of the patch workflow may then be used for all subsequent workflows, executing workflows may use the version they started with and are not impacted.

The automation service 534 obtains patch workflow information and generates workflows for particular instances 522. In addition, the automation service 534 may enable customers to manage, execute, and access the execution history of patch workflows. The automation service 534 may also be responsible for executing patch workflows and facilitating execution of the patch workflows with other services. The automation service 534 may generate a JavaScript Object Notation (JSON) corresponding to the patch workflow information provided by the customer to the patch workflow service 536. In this way the customer may generate patch workflow without having to provide a JSON of the patch workflow.

The maintenance window service 532 provides customers with the ability to define one or more recurring windows of time during which the patching service 504 may deploy patches to the instances 522. By defining maintenance windows and associating particular instances 522 with the maintenance windows, customer may ensure that any maintenance activities (e.g., patch deployment) is performed during a well-defined window of time thereby limiting the impact the patch workflows on the instances 522. In some embodiments, a default maintenance window is provided by the maintenance service. The customer can create, delete, or modify maintenance windows by submitting requests 538 from the client device 506, for example, by submitting API calls. The customer may also associate a set of instances 522 with particular maintenance windows. Returning to the example above, the customer may tag instances 522 (e.g., production) and assign tags to a particular maintenance window.

The notification service 530 may provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 530 may provide notifications to clients using a "push" mechanism without the need to check periodically or "poll" for new information and updates. The notification service 530 may further be used for various purposes such as monitoring applications executing in the instances, execution of patch workflows, time-sensitive information updates, and many others.

The instance service instantiates instances 522 based at least in part on a set of preferences provided by the customer. In one embodiment, the instance service receives, from the customer on the client device 506, a request 538 to create one or more instances 552 and optionally assign the created instances 522 to an auto-scale group 520 and/or load balancer 540. Additionally, the request 538 received from the customer on the client device 506 may also indicate a time to start execution of the requested instances 522. In response to receiving the request, the instance service instantiates instances 522. In various embodiments, the auto-scale service receives the request and transmits a command to the instance service to instantiate the instances 522 such that the instances are associated with the auto-scale group, for example, by associating auto-scale group 520 metadata with the instances 522.

The customer may interact with the computing resource service provider (via appropriately configured and authenticated API calls) to provision, operate, and manage instances 522 on server computers 542 operated by the computing resource service provider. Additionally, the customer may create one or more auto-scale groups 520, and the auto-scale groups 520 may be a logical collection of instances 522. Furthermore, the instances 522 may be assigned to the auto-scale group 520 or may be members of the auto-scale group 520. The auto-scale service may allow customers to interact with and manage various auto-scale groups. For example, the customer may, through the auto-scale service, set a maximum or minimum capacity for an auto-scale group 520. In addition, the customer may also define preferences for the behavior of the auto-scale group 520 during patch deployment. For example, the customer may specify that members of the auto-scale group 520 are to be replaced when a member is removed from the group during actions of the patch workflow. In another example, the customer may specify that only ten percent of the instances 522 of the customer's auto-scale group may concurrently execute a patch workflow or otherwise have patches 546 deployed to them.

Figure 5:
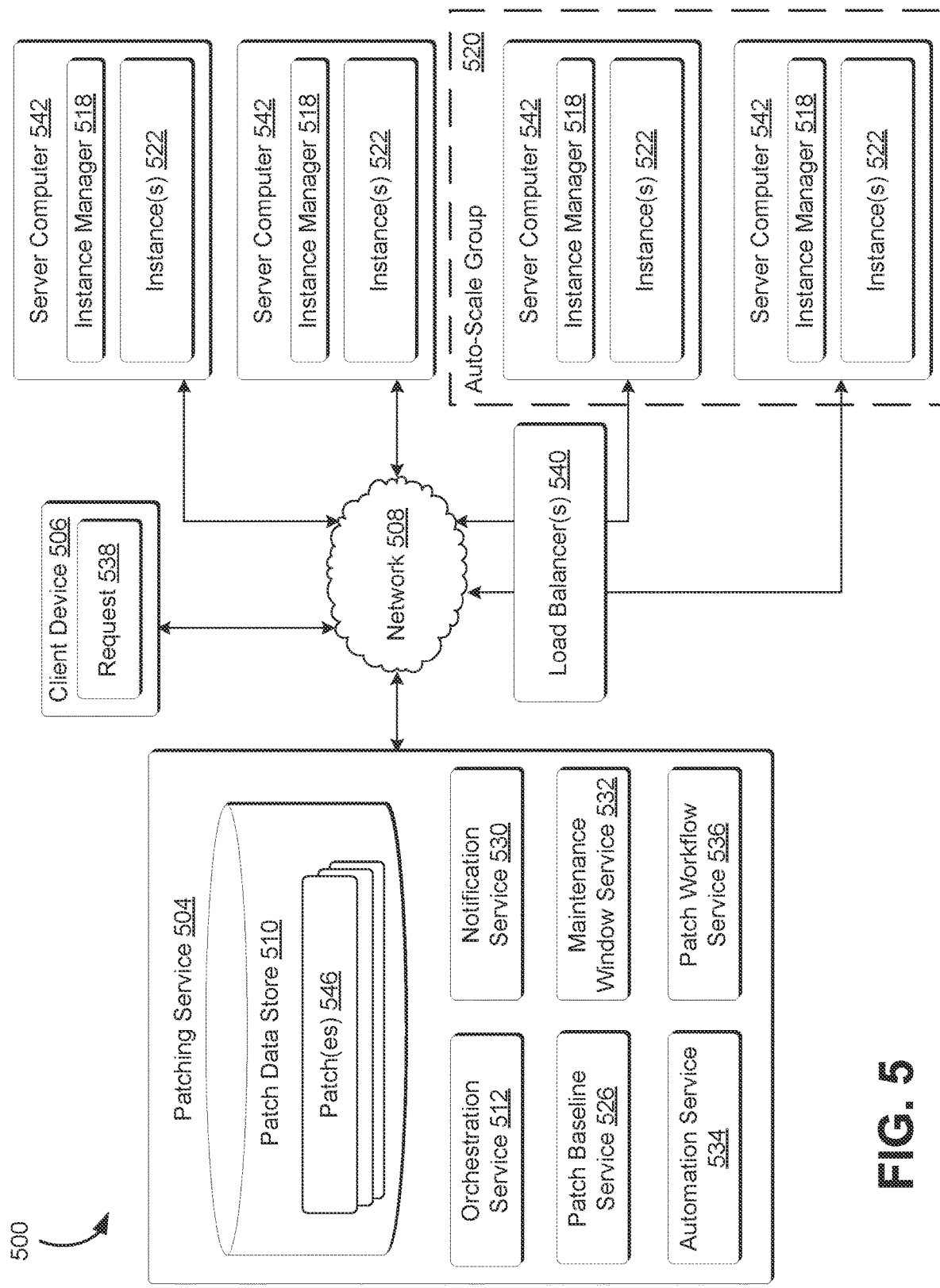
FIG. 5 illustrates an environment in which a patching service may automate certain aspects of software patching computing resources on behalf of a customer in accordance with an embodiment.

As described above, the management console may be exposed to the customers as a webpage; by interacting with the webpage (e.g., through a browser application) the customer may cause API calls to be generated. The generated API calls may cause the computing resource service provider or component thereof, such as the patching service 504, to perform various operations indicated by the customer. The customer may also assign one or more load balancers 540 to the auto-scale group 520 or particular sets of instances 522. The instances 522 of the auto-scale group 520 or those assigned to a load balancer 540 may be used for various purposes, such as to operate as servers supporting a website, to operate business applications, or generally, to serve as computing power for the customer. Other applications for the instances 522 may be to support database applications, electronic commerce applications, business applications and/or other applications. Additionally, load balancers 540 may distribute traffic to various instances 522 of the auto-scale group 520 to enable operation of the instances 522 for the various purposes described above and prevent the instances 522 of the auto-scale group 520 from being overloaded. Although the instances 522 as shown in FIG. 5 are virtualized, any other computer system or computer system service may be utilized by the computing resource service provider, such as a computer system or computer system service that does not employ virtualization or instantiation and instead provisions computing resources on dedicated or shared computers/servers and/or other physical devices.

A load balancer service may be offered to customers of a computing resource service provider in order to facilitate request processing by instances 522 of the customer. In various embodiments, the instances 522 may be assigned to the auto-scale group 520 and the load balancer service may distribute traffic to the instances 522 assigned to the auto-scale group 520. For example, the customer may operate a website using instances 522 assigned to the auto-scale group 520 using the resources of the computing resource service provider. Additionally, the website may receive requests from multiple other customers over the network 508. The load balancer 540 may direct the requests to the instances 522 of the auto-scale group 520 executing the website, in such a way that the load generated by processing the requests is distributed among the instances 522 of the auto-scale group 520 executing the website.

Figure 6:
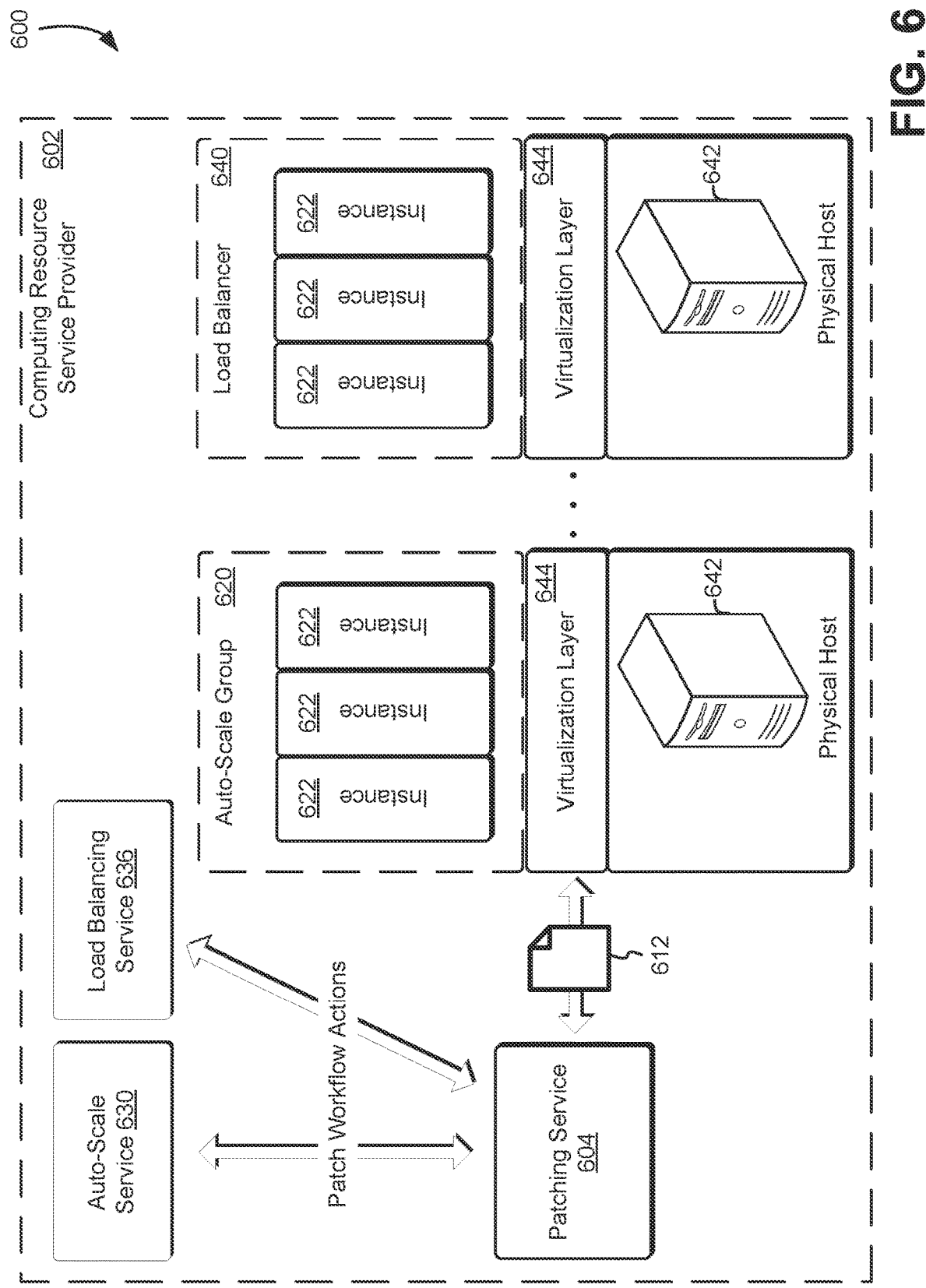
FIG. 6 illustrates an environment in which a patching service may automate certain aspects of software patching computing resources using various patch workflows in accordance with an embodiment.

FIG. 6 illustrates an environment 600 in which a patching service 604 executing a patch workflow 612 in accordance with at least one embodiment. The patching service 604, which may be implemented by physical hardware, is used by a computing resource service provider to provide patching automation for customers. The physical hardware may include a server computer 642. The server computer 642 may be any device or equipment configured to execute instructions for performing data computation, manipulation, or storage tasks, such as a computer or a server. A server computer 642 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications, or data transfer protocol. The physical hardware may also include storage devices, such as storage disks and tapes, networking equipment, and the like.

A virtualization layer 644 may include a bare metal hypervisor or a hosted hypervisor. The virtualization layer 644 executing on the server computer 642 enables the physical hardware to be used to provide computational resources upon which one or more computer instances 622 may operate. For example, the virtualization layer 644 may enable an instance 622 to access physical hardware on the server computer 642 through virtual device drivers executed by the instance 622. The virtualization layer 644 may include a hypervisor or virtualization software and/or hardware. The virtualization layer 644 may also include an instance of an operating system dedicated to administering the instances 622 running on the server computer 642. Each virtualization layer 644 may include its own networking software stack, responsible for communication with other virtualization layers 644 and, at least in some embodiments, also responsible for implementing network connectivity between the instances 622 running on the server computer 642 and other instances 622 running on other server computers 642.

Furthermore, the server computer 642 may host multiple virtualization layers 644 of the same or different types on the same server computer 642. The virtualization layer 644 may be any device, software, or firmware used for providing a virtual computing platform for the instances 622. The virtual computing platform may include various virtual computer components, such as one or more virtual CPUs, virtual memory, and the like. The instances 622 may be provided to the customers of the computing resource service provider 602 and the customers may run an operating system or an application on the instances 622. Further, the computing resource service provider 602 may use one or more of its own instances 622 for executing its applications. At least a portion of the instances 622 may execute kernel-level components for one or more other instances 622. For example, a particular computer instance may execute a parent partition configured to manage one or more child partitions executed by other computer instances, where the particular computer instance and the other computer instances are supported by the same virtualization layer 644.

Commands and other information may be included in an API call from the patching service 604, the auto-scale service 630, or the load balancing service 636 to the virtualization layer 644. As described above, the patching service 604 may enable the customer to create a patch workflow 612 which automates deployment of patches to the instances 622. As illustrated in FIG. 6, the instances 622 may be associated with and/or managed, at least in part by, other services of the computing resource service provider 602 such as an auto-scale service 630 and/or a load balancing service 636 as described above. The patching service 604 may execute patch workflow 612 operations by transmitting requests to the instances 622, virtualization layer 644, or other services of the computing resource service provider 602. The request may be an API call including information corresponding to the patch workflow 612. The virtual machine management service may be implemented in at least some embodiments, enabling a variety of client applications to run on virtual computer servers or instances 622 instantiated on behalf of the customers. The instances 622 may each comprise a virtual machine, with its own operating system comprising a networking software stack, and multiple such instances may be hosted on a given server computer 642 at a service provider network data center.

Additionally, a load balancing service 636 and the auto-scale service 630, described in greater detail above, may transmit commands and other information included in an API call to the patching service 604. Execution of a particular action of the patch workflow 612 may require communication with the other services of the computing resource service provider 602. For example, the patching service 604 may communicate with the load balancing service 636 to determine whether a particular instance 622 associated with an action of the patch workflow 612 is associated with the load balancer 640. Based at least in part on the information obtained from the load balancing service 636 the patching service 604 or other service, such as the automation service described above, may modify the execution of the action. In yet other embodiments, particular actions of the patch workflow 612 require execution of the operation by the other services of the computing resource service provider 602. For example, the patching service 604 may transmit a command to the auto-scale service 630 to remove a particular instance 622 from the auto-scale group 620 to perform a particular patch action.

Figure 7:
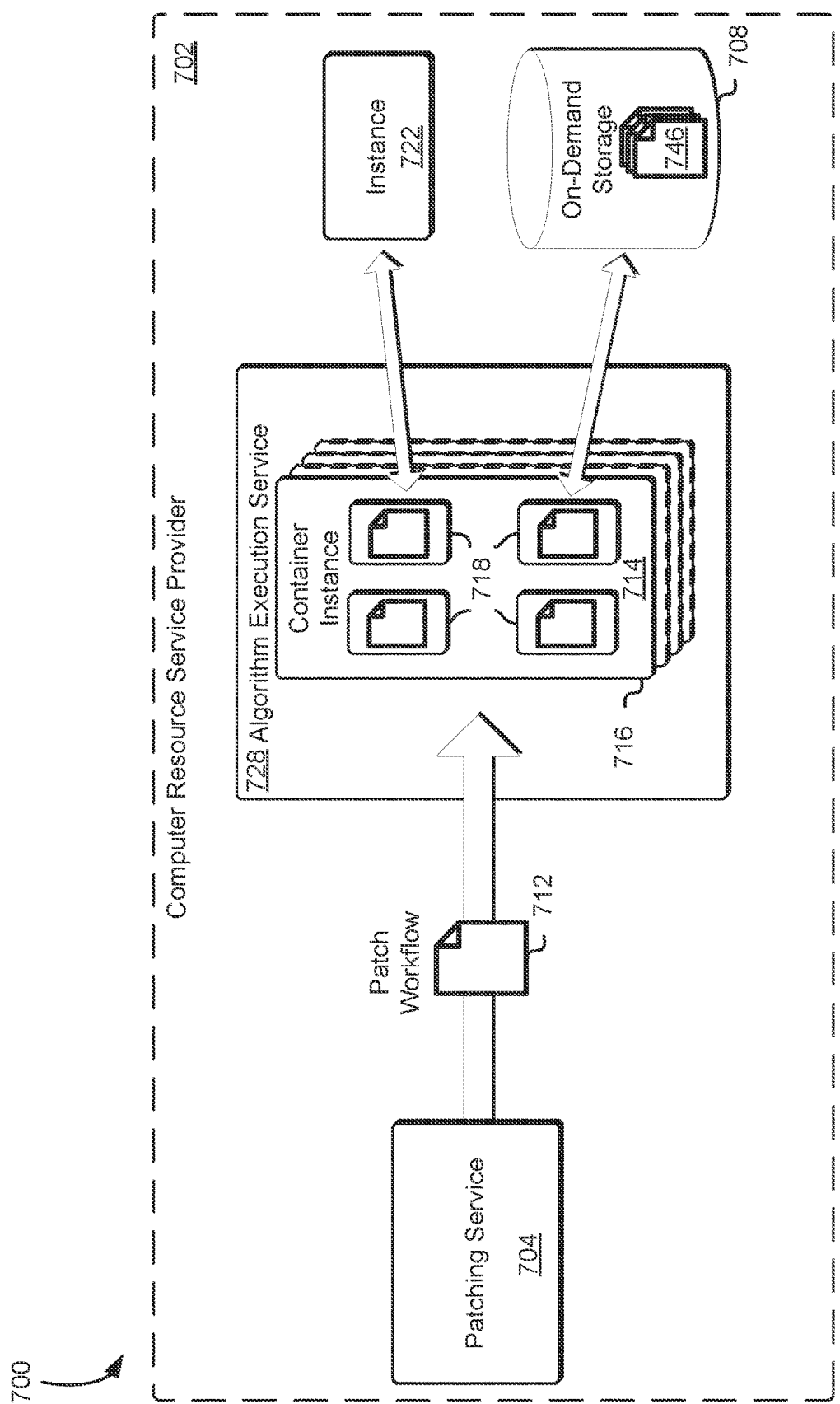
FIG. 7 illustrates an environment in which a patching service may automate certain aspects of software patching computing resources using container instances in accordance with an embodiment.

FIG. 7 illustrates an aspect of an environment 700 in which an embodiment may be practiced. As illustrated in FIG. 7, the environment 700 may include a patching service 704 that executes one or more actions of a patch workflow 712 using software functions 718. The software functions may be executed as a result of a request to launch tasks transmitted over a network (not illustrated in FIG. 7 for simplicity) to an algorithm execution service 728 of a computing resource service provider 702. A scheduler may determine into which container instance 714 of a cluster 716 of container instances that the software functions 718 specified in the patch workflow 712 should be launched. In some embodiments, the software functions 718 may be configured to share and/or access computing resources provided by other services of the computing resource service provider 702. For example, the software function 718 may remove instances 722 from an auto-scale group or load balancers as described above. In another example the software function 718 may provide data 746 associated with the instance 722 to an on-demand data storage service 708 of the computing resource service provider 702. In various embodiments, a notification indication execution of the software function 718 may be provided to the patching service 704.

The patching service 704 may contain patch workflows 712 to perform various patch operations include pre-patch actions, post-patch actions, patch actions, and reboot policies. In some embodiments, a single container instance 714 may be instantiated per action or operation of the patch workflow 712. Alternatively, the computing resource service provider 702 may provide a fleet or cluster 716 of container instances 714 to perform one or more actions and/or operations of the patch workflow 712. The cluster 716 of container instances 714 may include multiple Internet Protocol (IP) addresses and a Network address translation (NAT) gateway configured to route traffic to the IP addresses. In this scenario, the patching service 704 may be provided a particular IP address and traffic for the patching service 704 is directed to the corresponding container instance 714 of the cluster 716 responsible for processing the request (e.g., a request to perform an action of the patch workflow 712), based at least in part on information provided by the NAT gateway. In various embodiments, the algorithm execution service 728 or other services of the computing resource service provider 702 may contain the task and/or software function 718 to be executed by the container instance 714 on behalf of the patching service 704. In such embodiments, the patching service 704 may transmit a request to the computing resource service provider 702 to execute one or more tasks and/or software functions 718 indicated in the patch workflow 712.

In some examples, a "task definition" or "task definition file" may refer to a file specifying a set of linked containers (i.e., a set of containers that, when running on a host computing system, are associated with each other) that are assigned to start as a group. The task definition may further specify disk and network locations that the software functions 718 are able to share on a single physical machine. The task definition may then be utilized for launching the set of container instances 714. In some implementations, the task definition may define and link software functions 718 spread across multiple physical machines. One task definition may contain and schedule many tasks. In some examples, a "task" may refer to an instantiation of a patch workflow 712, and may consist of one or more software functions 718. Tasks may be modified by applying a new task definition to the task.

The patch workflow 712 may contain all the information needed to place software functions 718 in container instances 714 of a cluster 716, and the cluster 716 may be managed through application programming interface calls. This information may be provided as parameters to the patch workflow as described above. An example task definition specifies that one or more tasks with a given name have a software image located at a particular patch. Furthermore, the task definition may allocate processing capacity, memory, IP address, port, and other computing resources to particular tasks of the one or more tasks. Similarly, the task definition may also specify storage locations for data objects to be processed and data objects that may be created as a result of execution of the software functions 718, such as the on-demand storage 708 illustrated in FIG. 7. In various embodiments, the task definition indicates an interaction between tasks and/or software functions 718. For example, a particular task definition indicates that a first task obtains an image of the instance 722, a second task stores the image of the instance 722 as data 746 in the on-demand storage 708. Each task described above may have a software function 718 associated with the task and may be executed by the same or different container instances 714.

The algorithm execution service 728 may be a service provided by the computing resource service provider 702 to allow the patching service 704 to execute the software functions 718 within a single container 714 or a cluster 716. The computing resource service provider 702 may provide one or more computing resource services to its customers individually or as a combination of services of a distributed computer system. The one or more computing resource services of the computing resource service provider 702 may be accessible over a network and may include services such as virtual computer system services, block-level data storage services, cryptography services, on-demand data storage services, notification services, authentication services, policy management services, task services, notification services, data warehouse services, data streaming services, and/or other such services. Not all embodiments described include all of the services described and additional services may be provided in addition to, or as an alternative to, services explicitly described.

The patching service 704 supported by the algorithm execution service 728 of the computing resource service provider 702 may communicate with one or more of the services, including the algorithm execution service 728, via an interface, which may be a web service interface or any other type of customer interface. Each service provided by a computing resource service provider may have its own interface and subsets of the services may have corresponding individual interfaces in addition to, or as an alternative to, a common interface.

In some examples, a "container instance" may refer to a computer system instance (virtual or non-virtual, such as a physical computer system running on an operating system) that is configured to launch and run software functions 718. Thus, the container instance 714 may be configured to run the software functions 718 within the container instance 714 in accordance with the patch workflow 712 provided by the patching service 704 or other entity, such as a software developer, technician, or other service of the computing resource service provider 702. One or more container instances 714 may comprise a cluster 716. In some examples, "cluster" may refer to a set of one or more container instances 714 that have been registered with the cluster. Thus, the container instance 714 may be one of many different container instances 714 registered with the cluster 716, and the other container instances of the cluster 716 may be configured to run the same or different types of software functions 718 as the container instance 714. The container instances 714 within the cluster 716 may be of different instance types or of the same instance type, and the patching service 704 may have access to or interact with more than one cluster 716. Thus, the patching service 704 may launch one or more clusters 716 and then manage the software functions 718 within each cluster 716 through application programming interface calls.

A software function 718 may be a lightweight virtualization instance running under a computer system instance that allows processes and data used by the processes within the software function 718 to be isolated from other processes running in the same computer system instance or container instance 714. Thus, the software functions 718 may each be virtualization instances running under an operating system of the container instance 714 and executing in isolation from each other. Each of the software functions 718 may have their own namespace, and applications running within the software functions 718 are isolated by only having access to resources available within the container namespace. Thus, software functions 718 may be an effective way to run one or more single applications within their own namespace. A container encapsulation system allows one or more software functions 718 to run within a single operating instance without overhead associated with starting and maintaining virtual machines for running separate user space instances.

An example container encapsulation system is the Docker (RTM) container engine. For example, an application may consist of several software functions 718, these software functions 718 may be configured to perform operations on behalf of the patching service 704 or other service of the computing resource service provider 702. The software functions 718 are executed in a container instance 714, as described above, using computing resources of a computing resource service provider 702 and thereby reducing or eliminating load on the patching service 704. Software developers, technicians, and others associated with the patching service 704 may develop applications and software functions 718 to perform various actions and/or operations of the patch workflow 712 using computing resources of the computing resource service provider 702.

The software functions 718 may be launched to have only specified resources from resources allocated to the container instance 714; that is, a software function 718 may be launched to have a certain amount of memory and to not utilize more than a specified amount of processing power. The resource allocation for the software functions 718 may be specified in the patch workflow 712 as described above. Multiple software functions 718 may be running simultaneously on a single host computer or host container instance, and the resources of the host can be allocated efficiently between the software functions 718, container instances 714, and/or clusters 716 of container instances 714. In some embodiments, a host may support running software functions 718 in container instances 714 from only the patching service 704. In other embodiments, a single host may allow multiple services of the computing resource service provider 702 to have container instances 714 running on the host. In the latter case, the algorithm execution service 728 may provide security to ensure that the services of the computing resource service provider 702 are unable to access containers, clusters, or container instances of the others.

Different types of tasks may have different resource requirements and may have different lifespans. Thus, the software functions 718 may be dynamically scheduled to run by a scheduler service in the algorithm execution service 728 independent of an underlying operating system of the container instance 714, and as such, the underlying operating system of the container instance 714 may be very basic. Alternatively, the containers 714 may be scheduled to run by a scheduler installed within the container instance 714 of the cluster 716. The other services may be services such as services described above of the computing resource service provider. Likewise, the other resources may include resources that can be shared between virtualized instances, such as storage computing resources of a block-level data storage service or the on-demand data storage 708.

As noted, a container encapsulation system provided by or interfaced to the algorithm execution service 728 may allow a customer, technician, or software developer to configure one or more applications within a software function 718 of an operating system that supports containers. The base container and the applications and data within it may then be packaged as an image. In some examples, an "image" may refer to an entire copy of a particular state of the base container at the time the image was generated. The image thereafter may be used to launch one or more identical software functions, each of which may be assigned the specified amount of resources and may be isolated from each other. The software functions may be launched on the same or different physical machines and each software function may be expected to run in exactly the same way as the base container.

Figure 8:
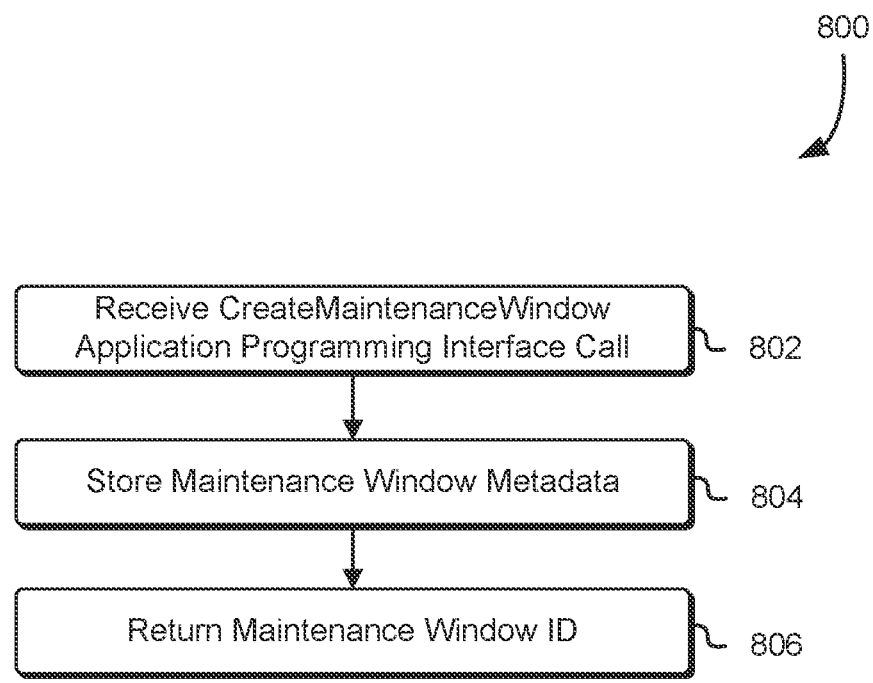
FIG. 8 is a block diagram that illustrates an example of creating a maintenance window in accordance with an embodiment.

FIG. 8 is a block diagram illustrating an example of a process 800 for creating a maintenance window in accordance with various embodiments. The process 800 may be performed by any suitable system such as a server in a data center, multiple computing devices in a distributed system of a computing resource service provider, or any virtual computing instance such as those described above in connection with FIG. 5. The process 800 includes a series of operations wherein a CreateMaintenanceWindow application programming interface call is received from a requestor (this may include authentication of the requestor), the maintenance window metadata is stored in a database, and a maintenance window ID is generated and provided to the requestor.

In 802, a computing resource service provider receives an application programming interface call from a customer or other entity to create a maintenance window. Creating a maintenance window may include generating a maintenance window ID and storing the maintenance window ID in a database along with other information and metadata associated with the maintenance window 804. The customer may call the CreateMaintenanceWindow API to create a set of rules which may be evaluated by the patching service or component thereof, such as the patch orchestration service, to determine an interval of time to deploy patches to one or more instances associated with the customer. As described above, the customer may provide a set of specific instances to be updated and/or patched (if a patch and/or update is available) during the maintenance window or the customer may specify types or categories of instances to be updated and/or patched.

Once stored, in 806, the system performing the process 800 may notify the requestor that creation of the maintenance window has been successful. In some cases, this notification may include additional information/metadata about the maintenance window. Thereafter, the requestor may utilize the maintenance window ID to edit or delete the maintenance window using additional API calls. For example, the customer may add additional targets (e.g., computing resources to receive patch deployments during the maintenance window) by calling an AddTargetToMaintenanceWindow API using the maintenance window ID. In another example, the customer may register particular patch workflows for deploying patches to the targets included in the maintenance window by calling a RegisterWorkflowWithMaintenanceWindow API using the maintenance window ID.

Figure 9:
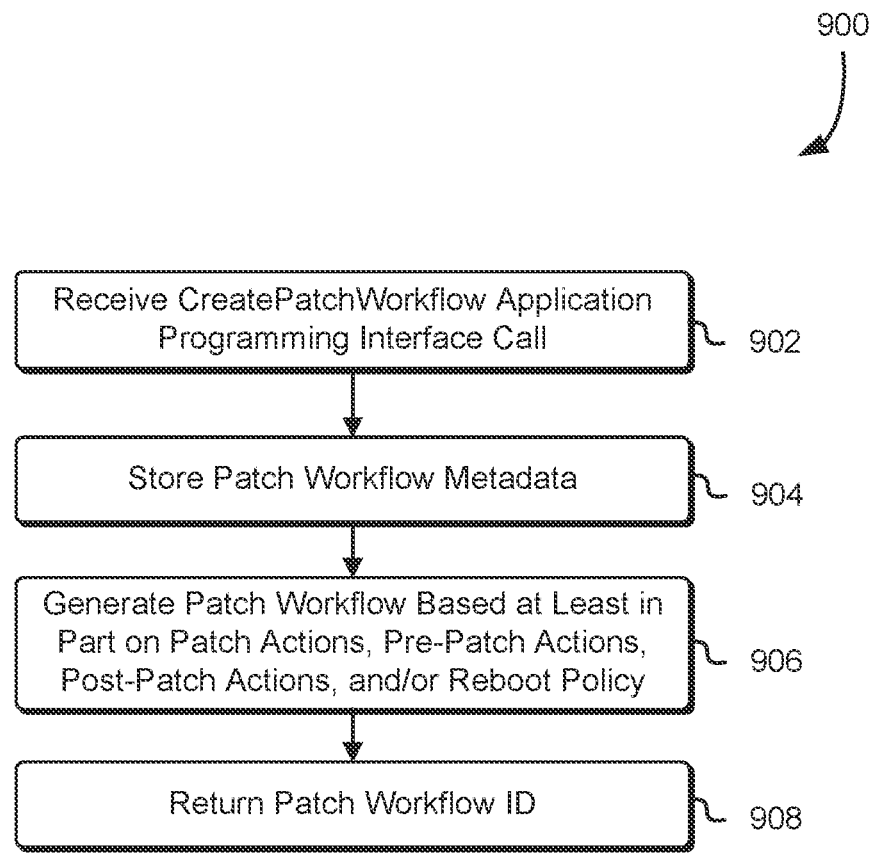
FIG. 9 is a block diagram that illustrates an example of creating a patch workflow in accordance with an embodiment.

FIG. 9 is a block diagram illustrating an example of a process 900 for creating a patch workflow in accordance with various embodiments. The process 900 may be performed by any suitable system such as a server in a data center, multiple computing devices in a distributed system of a computing resource service provider, or any virtual computing instance such as those described above in connection with FIG. 5. The process 900 includes a series of operations wherein a CreatePatchWorkflow application programming interface call is received from a requestor (this may include authentication of the requestor), the patch workflow metadata is stored in a database, actions and/or operations of the patch workflow are generated, and a patch workflow ID is generated and provided to the requestor.

In 902, a computing resource service provider receives an application programming interface call from a customer or other entity to create a patch workflow. Creating a patch workflow may include providing information to an automation service as described above in connection with FIG. 5 to generate a workflow (e.g., a set of operations to accomplish a task). In 904, the system performing the process 900 may store metadata associated with the patch workflow in a database including the patch workflow ID, maintenance windows associated with the patch workflow, instances associated with the patch workflow, and other information associated with the patch workflow.

In 906, the patch workflow service may determine, based at least in part on information provided by the customer, pre-patch action, post-patch actions, and patch action. In addition, the patch workflow service may determine operations required to execute these actions based at least in part on one or more attributes of the instances associated with the patch workflow. For example, the patch workflow service may determine if an instance is to be removed from a load balancer and/or auto-scale group prior to execution of a particular action. Other attributes of the instance include a type or category of computing resource, application executed by the instance, database associated with the instance, data store associated with the instance, virtual hardware connected to the instance, physical hardware connected to the instance, a network associated with the instance, or any other attribute of the instance that requires performance of an operation to complete an action included in the patch workflow.

Once the patch workflow has been created in 908, the system performing the process 900 may notify the requestor that creation of the patch workflow has been successful. The notification may include a patch workflow ID. The patch workflow ID may be used by the customer to edit or delete the patch workflow as well as assign the patch workflow to a maintenance window or particular instances. In numerous variations of the process 900, the patch workflow service generate that patch workflow without modifying the action based at least in part on one or more attributes of the instances associated with the patch workflow. In such embodiments, the patching service may modify the patch workflow at execution time, for example, once the patch orchestration service determine specific instances to apply a particular patch deployment.

Figure 10:
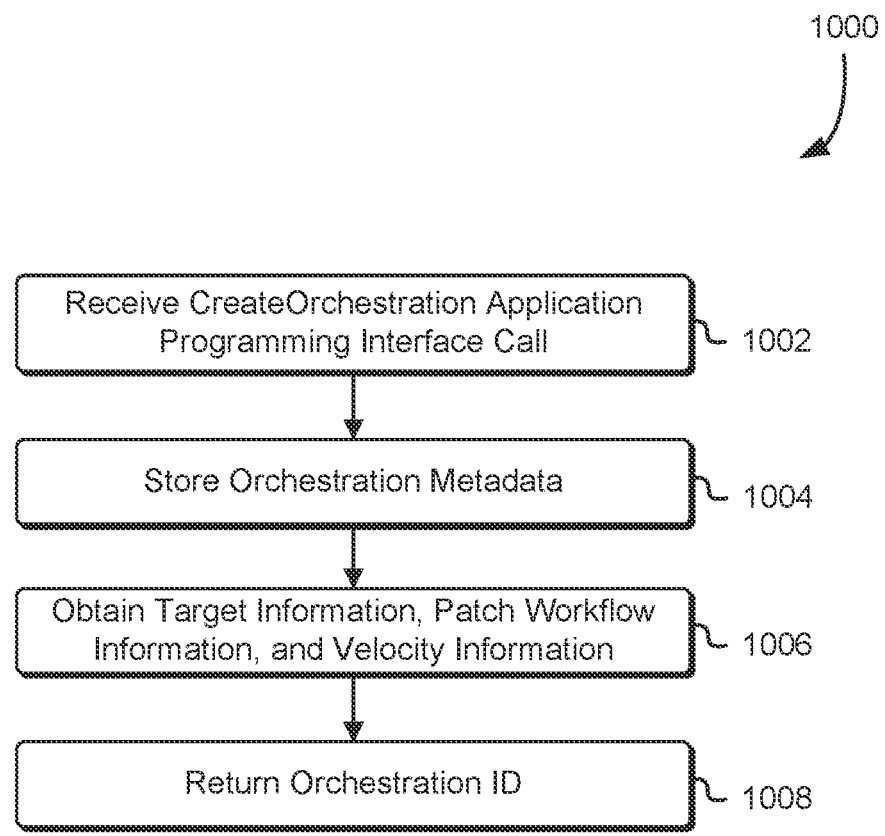
FIG. 10 is a block diagram that illustrates an example of creating a patch orchestration in accordance with an embodiment.

FIG. 10 is a block diagram illustrating an example of a process 1000 for creating a patch orchestration in accordance with various embodiments. The process 1000 may be performed by any suitable system such as a server in a data center, multiple computing devices in a distributed system of a computing resource service provider, or any virtual computing instance such as those described above in connection with FIG. 5. The process 1000 includes a series of operations wherein a CreateOrchestration application programming interface call is received from a requestor (this may include authentication of the requestor), the patch orchestration metadata is stored in a database, and a patch orchestration ID is generated and provided to the requestor.

In 1002, a computing resource service provider receives an application programming interface call from a customer or other entity to create a patch orchestration. Creating a patch orchestration may include generating an orchestration ID and storing metadata associated with the patch orchestration in a database 1004. The patch orchestration may be maintained by a patch orchestration service as described above in connection with FIG. 5. The patch orchestration service may be responsible for determining targets, patch workflows, and other information required to automate various patching activities.

In 1006, the system performing the process 1000 may obtain target information, patch workflow, and velocity information. The target information may include a set of computing resources to receive patch deployments during particular maintenance windows. The target information may include a list of particular computing resources or may provide target information based on at least in part on a category, type, or other attribute of the computing resource. The patch workflow information may indicate one or more patch workflows to execute for the targets. The velocity information may include a speed or rate at which the target may receive patch deployments as part of the patch workflow. For example, the velocity information may indicate that only ten percent of the customers computing resources may receive a patch deployment at any given time. In 1008, the system performing the process 10000 may notify the requestor that creation of the patch orchestration has been successful. The notification may include a patch orchestration ID. The patch orchestration ID may be used to edit or delete the patch orchestration.

Figure 11:
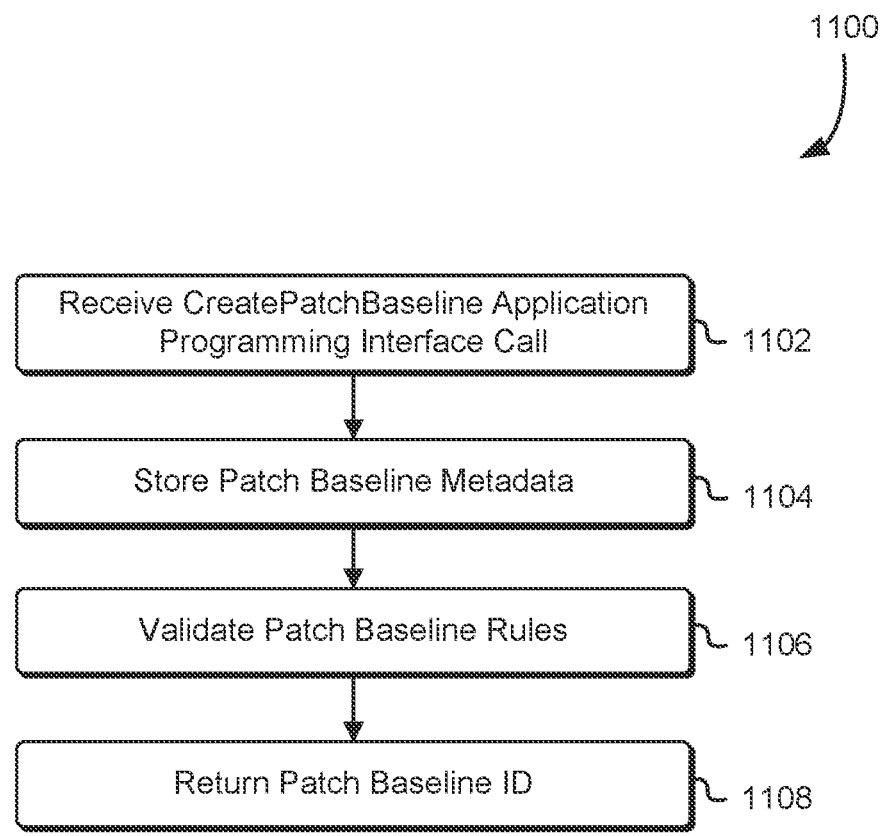
FIG. 11 is a block diagram that illustrates an example of creating a patch baseline in accordance with an embodiment.

FIG. 11 is a block diagram illustrating an example of a process 1100 for creating a patch baseline in accordance with various embodiments. The process 1100 may be performed by any suitable system such as a server in a data center, multiple computing devices in a distributed system of a computing resource service provider, or any virtual computing instance such as those described above in connection with FIG. 5. The process 1100 includes a series of operations wherein a CreatePatchBaseline application programming interface call is received from a requestor (this may include authentication of the requestor), the patch baseline metadata is stored in a database, the patch baseline rules are validated, and a patch baseline ID is generated and provided to the requestor.

In 1102, a computing resource service provider receives an application programming interface call from a customer or other entity to create a patch baseline. Creating a patch baseline may include generating a patch baseline ID, generating a rule set for the patch baseline, and storing metadata associated with the patch baseline in a database 1104. The patch baseline may be maintained by a patch baseline service as described above in connection with FIG. 5. The patch baseline service may be responsible for determining what patches to deploy at any given time. The patch baseline metadata may include information indicating one or more targets or type of targets the patch baseline is associated with.

In 1106, the system performing the process 1100 may validate the patch baseline rules. The patch baseline rules may include at least some rules generate by the customer. For example, the customer may use the management consoles as described above in connection with FIG. 3, to generate rules indicating when particular categories of patch are approved for deployment. In 1108, the system performing the process 1100 may notify the requestor that creation of the patch baseline has been successful. The notification may include a patch baseline ID. The patch baseline ID may be used to edit or delete the patch baseline.

Figure 12:
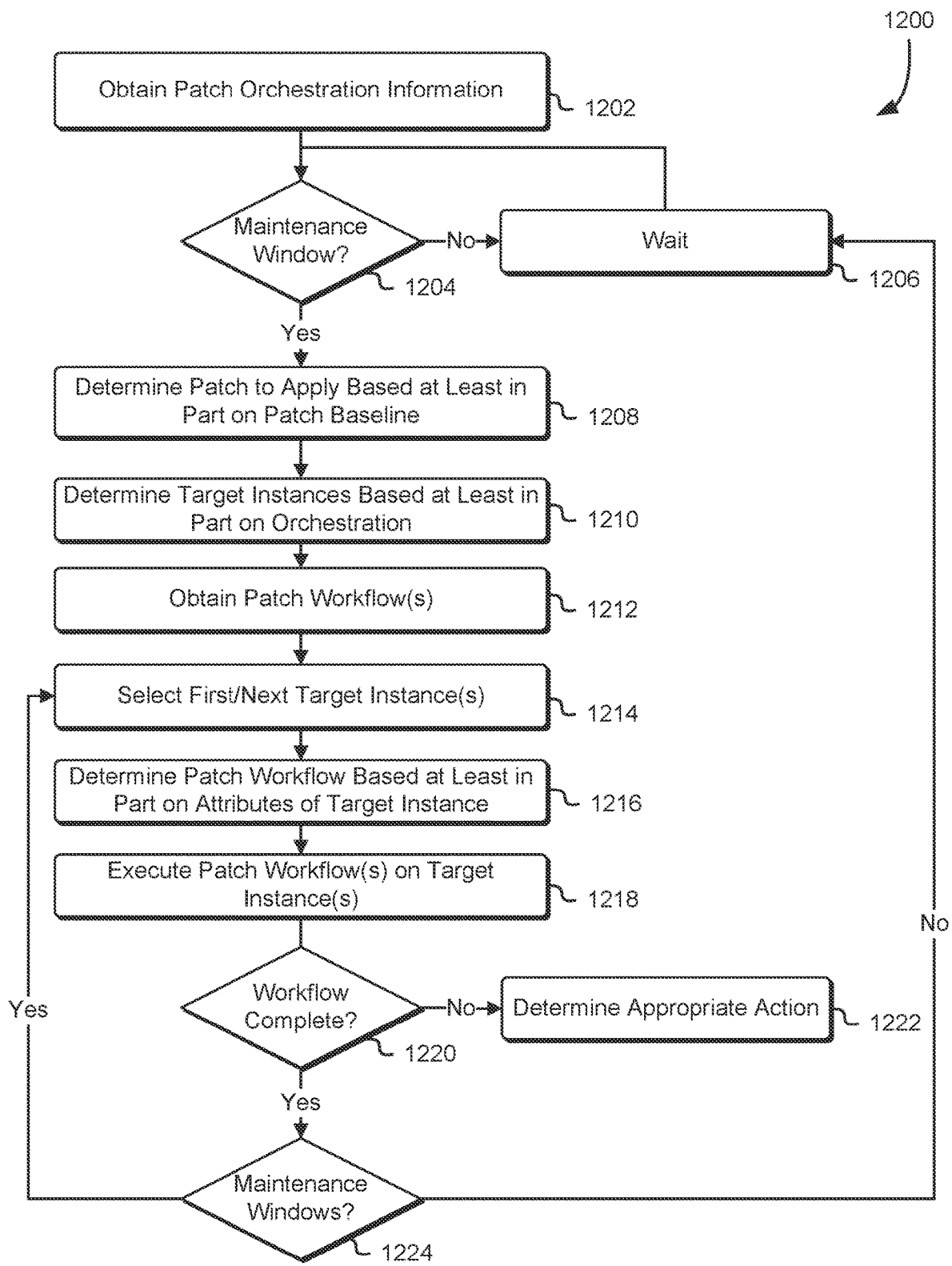
FIG. 12 is an illustrative process for automating certain aspects of software patching computing resources on behalf of a customer in accordance with an embodiment.

FIG. 12 shows an illustrative process 1200 which may be used to automate deployment of patches to computing resources provided by a computing resource service provider and operated by customers of the computing resource service provider in accordance with at least one embodiment. The process 1200 may be performed by any suitable system such as the patching service described above in FIG. 5 or any combination of systems or component thereof. Returning to FIG. 12, in an embodiment, the process 1200 includes obtaining orchestration information 1202. As described above, the customer may create a patch orchestration by defining targets (e.g., computing resources), patch workflows for the targets, and velocity information. This information may be stored or otherwise maintained by the patch orchestration service. The patching service may obtain this information from the patch orchestration service to evaluate what operations to perform to complete automated patching on behalf of the customer.

The patching service may then determine if the current time is within a maintenance window 1204. The maintenance window may be an interval of time defined by the customer for deploying patches to one or more computing resources, including computing resources located within a data center or other facility operated by the customer. The patching service may also provide a default maintenance window on behalf of the customer. If it is not currently within the maintenance window, the system performing the process 1200 may wait 1206 until such a time. The system performing the process 1200 may periodically or aperiodically check to determine if the current time is within a maintenance window. If it is within a maintenance window, the system performing the process 1200 may determine a patch to apply based at least in part on a patch baseline 1208.

The patch baseline may include a set of rules provided by the customer for determining when to approve particular patches as described above in connection with FIG. 3. The patches may be maintained in a patch database and may include metadata or other information that may be used to evaluate the rules included in the patch baseline to determine whether to apply the patches. The system performing the process 1200 may then determine a set of target instances based at least in part on the patch orchestration 1210. The patch orchestration may include a set of target instance to be patched during particular maintenance windows. In addition, the system performing the process 1200 may determine the set of target instances based at least in part on patches approved for deployment. For example, if only patches for a particular operating system are currently approved for deployment, the set of targets may be limited to computing resources executing such an operating system.

In 1212, the system performing the process 1200 may obtain one or more patch workflows. The patch workflows may be maintained by a patch workflow service and may be generated based at least in part on a set of action provided by the customer. Furthermore, at least a portion of the step and/or operations of the patch workflow may be generated by an automation service as described above in connection with FIG. 5. The patch workflows may define a set of actions to be performed during patch deployment which may include run commands or software functions to be executed by a container instance as described above. The system performing the process 1200 may then select the first/next target instance or plurality of target instances 1214 to receive the patch deployment as a result of execution of the patch workflow. The instances may be selected based at least in part on the velocity information or other information provided in the patch orchestration.

Once the instance have been selected, the system performing the process 1200 may then determine a particular patch workflow to execute based at least in part on attributes of each target instance 1216. Various patch workflows may include operations specific to an attribute of an instance. For example, a particular patch workflow may include a pre-patch action of removing an instance from an auto-scale group as a result of an attribute of the instance indicating that the instance is a member of an auto-scale group. In another example, a particular patch workflow may include a pre-patch action disconnection from a remote database and a post-patch action of connection to the remote database a result of an attribute of the instance indicating that the instance is to be connected to the remote database. The additional operations may include any number of actions and may include pre-patch action, post-patch action, and patch actions. For example, an additional operation executed as a patch action may include causing the instance to execute a particular application using a run command. The additional operation may be indicated by the customer as described above in FIG. 2. In another example, an attribute of the instance may indicate that the instance is to be rebooted after execution of a patch workflow only when required by the patch. In such an example, an additional operation pf the patch workflow may include the post-patch action of rebooting the instance the patch indicates a reboot is required. The system executing the process 1200 may determine if the additional action of rebooting the instance is required when determining the patch workflow based at least in part on the attribute of the instance and may wait for the instance to complete and/or commence reboot operations before determining the workflow is complete.

If the patch workflow include additional operations specific to the attribute of the instance the system executing the process 1200 may determine if the additional operations completed successfully before allowing the execution of the workflow to continue. In addition, the system executing the process 1200 may determine the additional operations specific to the attribute of the instance contemporaneously or near contemporaneously with determining the patch workflow based at least in part on the attribute of the instance. In this manner, if the attribute of the instance indicates that no additional operations are required to complete the patch workflow successfully execution of the patch workflow may proceed without delay.

The system performing the process 1200 may then execute the patch workflows on the target instances 1218. Executing the patch workflows may include performing run commands or instantiating a container instance as described above. Furthermore, executing the patch workflows may include rebooting the target instances based at least in part on a reboot policy. The system performing the process 1200 may then determine if the workflow completes 1220. If the workflow did not complete successfully, for example, as a result of a time out of a particular action or a particular action returns an error, the system performing the process 1200 may determine an appropriate action 1222. The appropriate action may include retrying all or a portion of the patch workflow or attempting to mitigate or otherwise determine a solution to the error.

If the patch workflow is completed successfully, the system performing the process 1200 may then determine if the current time is still within the maintenance window 1224. If it is currently still within the maintenance window that system performing the process 1200 may then select the next set of target instances 1214 and continue the process 1200 as described above. If it is no longer within the maintenance window the system performing the process 1200 may wait 1206 for the next maintenance window and continue the process 1200.

Figure 13:
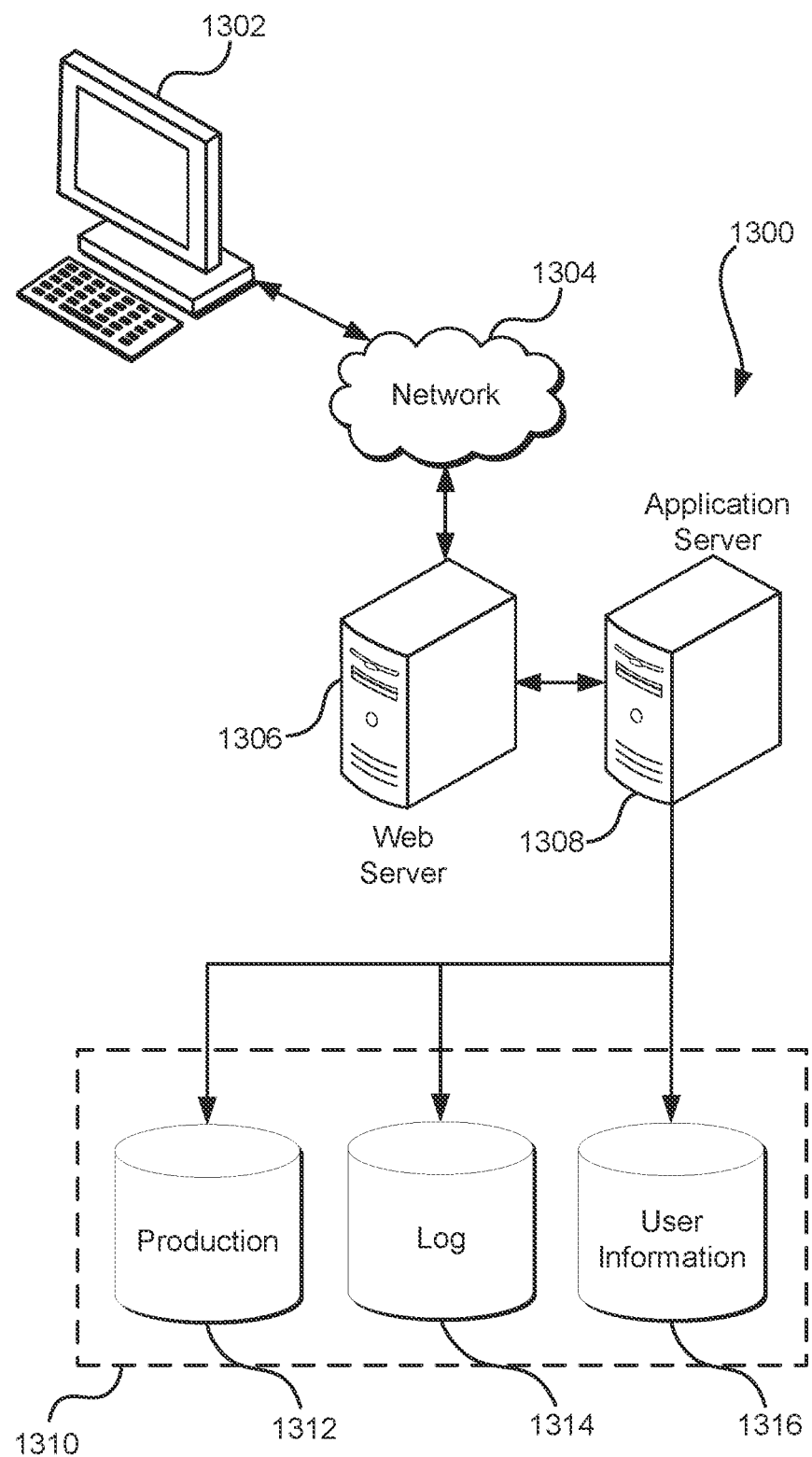
FIG. 13 illustrates an environment in which various embodiments can be implemented.

FIG. 13 illustrates aspects of an example environment 1300 for implementing aspects in accordance with various embodiments. As will be appreciated, although a web-based environment is used for purposes of explanation, different environments may be used, as appropriate, to implement various embodiments. The environment includes an electronic client device 1302, which can include any appropriate device operable to send and/or receive requests, messages, or information over an appropriate network 1304 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1302 and the application server 1308, can be handled by the web server using PUP: Hypertext Preprocessor ("PUP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1310 can include several separate data tables, databases, data documents, dynamic data storage schemes and/or other data storage mechanisms and media for storing data relating to a particular aspect of the present disclosure. For example, the data store illustrated may include mechanisms for storing production data 1312 and user information 1316, which can be used to serve content for the production side. The data store also is shown to include a mechanism for storing log data 1314, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. The application server 1308 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1302. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java©, C, C#, or C++, or any scripting language, such as Ruby, PUP, Perl, Python or TCL, as well as combinations thereof. The server(s) may also include database servers, including without limitation those commercially available from Oracle©, Microsoft*, Sybase*, and IBM© as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining information that specifies a set of actions defining at least a portion of operations of a patch workflow, the set of actions indicating at least one of a pre-patch action, patch action, or post-patch action and the patch workflow, when executed by one or more computer systems, causing the set of actions to be executed;
    determining a set of computer system instances to be associated with the patch workflow based at least in part on an identification of a customer of a computing resource service provider, wherein the computing resource service provider operates a plurality of hosts that support the set of computer system instances, and wherein the set of actions indicates a post-patch action that is specified by the customer via a user interface;
    obtaining, from the customer via the user interface, an indication of a first parameter that specifies a location, wherein a subset of the set of computer system instances to which a patch is to be deployed is dynamically determined based, at least in part, on one or more real-time attributes of individual instances of the set of computer system instances and the first parameter subsequent to waiting for a maintenance window specified by the customer;
    determining one or more other attributes of the subset of the set of computer system instances;
    determining an additional action to include in the patch workflow based at least in part on the one or more other attributes, where the additional action modifies the one or more other attributes as an operation of the patch workflow;
    storing the patch workflow and at least one other additional patch workflow including the additional action; and
    deploying the patch workflow and the at least one other additional patch workflow to the subset of the set of computer system instances at the specified location at least in part by causing one or more application program interface (API) calls to be sent from a patching service to a host of the subset of the computer system instances.

2. The computer-implemented method of claim 1, wherein:
    the one or more other attributes indicates that one or more computer system instances of the subset of the computer system instances requires rebooting;
    the additional action further comprises an instruction to reboot the one or more computer system instances of the subset of computer system instances subsequent to one or more patches being installed on the one or more computer system instances of the subset of computer system instances; and
    a status of the of the one or more other attributes is changed subsequent to the one or more computer system instances being rebooted.

3. The computer-implemented method of claim 1, wherein:
    a second parameter is obtained from the customer via the user interface;
    the second parameter includes an indication of a reboot policy; and
    the additional action is further determined based at least in part on the reboot policy.

4. The computer-implemented method of claim 1, wherein the post-patch action is to be performed subsequent to the patch being installed.

5. The computer-implemented method of claim 1, wherein:
the one or more API calls are sent from the patching service to a virtualization layer of the host; and
the one or more API calls correspond to operations of the patch workflow and the at least one other additional patch workflow.

6. The computer-implemented method of claim 1, wherein:
information that indicates at least a type of instance to be updated is obtained from the customer via the user interface;
the information is stored prior to the patch being released;
the plurality of hosts are shared by a plurality of different customers;
the subset of the set of computing system instances is determined based at least in part on the stored information that indicates the type of instance to be updated;
deploying the patch workflow and the at least one other additional patch workflow includes installing the patch; and
the one or more real-time attributes include customer-defined categories to which the individual instances are assigned by the customer.

7. A system, comprising:
one or more processors; and
memory that includes instructions that, when executed by the one or more processors, cause the system to:
determine a set of computer system instances based at least in part on an identification of a customer of a computing resource service provider, wherein the computing resource service provider operates a plurality of hosts that support the set of computer system instances;
obtain, from the customer via a user interface, an indication of a first parameter that is associated with deploying a patch to the set of computer system instances, wherein the first parameter specifies a location;
obtain a set of actions associated with deploying the patch to the set of computer system instances, wherein the set of actions is determined based at least in part on a post-patch action that is indicated by the customer of the computing resource service provider via the user interface;
determine one or more attributes of the set of computer system instances;
generate a set of patch workflows including operations associated with the set of actions and additional operations based at least in part on the one or more attributes;
store the set of patch workflows such that the set of patch workflows are usable to deploy patches to at least a subset of computer system instances of the set of computer system instances, wherein the subset of computer system instances to which the patch is to be deployed is dynamically determined based, at least in part, on one or more other real-time attributes of individual instances of the set of computer system instances and the first parameter subsequent to waiting for a maintenance window specified by the customer; and
deploy the set of patch workflows to the subset of the set of computer system instances at the specified location at least in part by a patching service sending one or more application program interface (API) calls to the subset of the set of computer system instances.

8. The system of claim 7, wherein:
the user interface is of a management console to at least allow the customer of the computing resource service provider to modify the set of patch workflows subsequent to the set of patch workflows being initiated; and
wherein the additional operations are determined based at least in part on the first parameter.

9. The system of claim 8, wherein the memory further includes instructions that, when executed by the one or more processors, cause the system to determine the subset of the set of computer system instances to receive the patch deployment, as a result of executing at least one patch workflow of the set of patch workflows subsequent to waiting for the maintenance window.

10. The system of claim 9, wherein the additional operations are determined based at least in part on the one or more attributes of the subset of computer instances as a result of receiving at a patching service an API call indicating a reboot policy specified by the customer via the user interface.

11. The system of claim 8, wherein the additional operations modify the set of patch workflows by at least adding pre-patch actions, post-patch actions, or patch actions that enables the set of patch workflows to complete without causing an error based at least in part on the one or more attributes.

12. The system of claim 11, wherein the memory further includes instructions that, when executed by the one or more processors, cause the system to:
detect a failure of an operation of the subset of patch workflows; and
output information that indicates a type of the error for presentation via the user interface.

13. The system of claim 7, wherein the instructions that cause the system to receive the set of actions further comprise instructions that, when executed by the one or more processors, cause the system to receive the set of actions as a result of the customer interacting with a management console presented to the customer as the user interface; and wherein:
the set of instances is instantiated on the plurality of hosts of the computing resource service provider;
the user interface includes a graphical user interface of a management console;
the management console is to allow the customer to manage the set of patch workflows; and
the management console allows the customer to assign one or more attributes to individual instances of at least a portion of the set of computer system instances.

14. The system of claim 13, wherein the management console is to allow the customer to manage the set of patch workflows by allowing the customer to modify the patch workflow during execution of the set of patch workflows.

15. A non-transitory computer-readable storage medium having stored thereon executable instructions that, as a result of being executed by one or more processors of a computer system, cause the computer system to at least:
determine a computing resource to which a patch is to be deployed based at least in part on an identification of a customer of a computing resource service provider and a parameter obtained from the customer, via a user interface, that specifies a location that includes the computing resource, wherein the computing resource is instantiated on a host of the computing resource service provider, wherein the computing resource to which the patch is to be deployed is dynamically determined based, at least in part, on one or more real-time attributes of the computing resource and the location as a result of waiting for a time to be in a maintenance window input by the customer;

obtain information that specifies at least one action to be performed during a deployment of the patch to the computing resource, wherein the information includes an indication of a post-patch action that is obtained from the customer via the user interface;

determine at least one additional action to be performed during deployment of the patch to the computing resource based at least in part on an other attribute of the computing resource;

generate a patch workflow based at least in part on the at least one action and the at least one additional action; and as a result of determining that the computing resource corresponds to the parameter, deploy the patch to the computing resource at least in part by causing one or more application program interface (API) calls to be sent from a patching service to the computing resource.

16. The non-transitory computer-readable storage medium of claim 15, wherein the at least one additional action further comprises rebooting the computing resource subsequent to the patch being installed on the computing resource.

17. The non-transitory computer-readable storage medium of claim 16, wherein the other attribute of the computing resource indicates that a reboot is required to implement a patch.

18. The non-transitory computer-readable storage medium of claim 15, wherein the user interface is of a management console of the computing resource service provider;

the management console corresponds to operations that may be taken by the customer of the computing resource service provider to control operations of a patching service of the computing resource service provider; and the instructions further comprise instructions that, as a result of being executed by the one or more processors, cause the computer system to display, via the management console, a status of the deployment subsequent to an operation of the patch workflow being initiated.

19. The non-transitory computer-readable storage medium of claim 15, wherein the instructions further comprise instructions that, as a result of being executed by the one or more processors, cause the computer system to transmit a command to the computing resource, execution of the command by the computing resource causes the computing resource to perform an operation of the patch workflow.

20. The non-transitory computer-readable storage medium of claim 15, wherein the instructions further comprise instructions that, as a result of being executed by the one or more processors, cause the computer system to transmit a request to at least one other computer system to perform an operation of the patch workflow.

21. The non-transitory computer-readable storage medium of claim 15, wherein the at least one additional action further comprises adding the computing resource to a load balancer group after deployment of the patch to the computing resource, where the one or more real-time attributes of the computing resource indicates an association with the load balancer group.

22. The non-transitory computer-readable storage medium of claim 15, wherein the instructions further comprise instructions that, as a result of being executed by the one or more processors, cause the computer system to present a status of the deployment via the user interface.

* * * * *